US012574961B2

(12) United States Patent
Calcev et al.

(10) Patent No.: US 12,574,961 B2
(45) Date of Patent: Mar. 10, 2026

(54) METHOD AND APPARATUS FOR UE INITIATED COT FOR FBE

(71) Applicant: Huawei Technologies Co., Ltd., Shenzhen (CN)

(72) Inventors: George Calcev, Hoffman Estates, IL (US); Brian Classon, Palatine, IL (US); Weimin Xiao, Hoffman Estates, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 397 days.

(21) Appl. No.: 18/164,049

(22) Filed: Feb. 3, 2023

(65) Prior Publication Data

US 2023/0180293 A1      Jun. 8, 2023

Related U.S. Application Data

(63) Continuation of application No. PCT/US2021/044718, filed on Aug. 5, 2021.

(60) Provisional application No. 63/104,318, filed on Oct. 22, 2020, provisional application No. 63/062,193, filed on Aug. 6, 2020.

(51) Int. Cl.
*H04W 74/0808* (2024.01)
*H04W 16/14* (2009.01)

(52) U.S. Cl.
CPC ....... *H04W 74/0808* (2013.01); *H04W 16/14* (2013.01)

(58) Field of Classification Search
CPC .. H04W 74/0808; H04W 16/14; H04W 74/08
See application file for complete search history.

(56) References Cited

U.S. PATENT DOCUMENTS

| | | |
|---|---|---|
| 2017/0318607 A1 | 11/2017 | Tiirola et al. |
| 2017/0325115 A1* | 11/2017 | Matsumoto ........... H04W 16/14 |
| 2018/0124611 A1* | 5/2018 | Moon ............... H04W 72/0453 |
| 2021/0084683 A1* | 3/2021 | Li ..................... H04W 74/0808 |
| 2021/0274555 A1* | 9/2021 | Alfarhan .......... H04W 74/0833 |
| 2021/0298080 A1* | 9/2021 | Wu ................... H04W 74/0816 |

(Continued)

FOREIGN PATENT DOCUMENTS

| | | | |
|---|---|---|---|
| CN | 111278123 A | 6/2020 | |
| WO | WO-2022024380 A1 * | 2/2022 | ............ H04W 72/04 |

OTHER PUBLICATIONS

Kumagai et al., "Terminal, Wireless Communication Method, and Base Station", Feb. 3, 2022, WO, WO-2022024380 (Year: 2022).*

(Continued)

*Primary Examiner* — Michael K Phillips
(74) *Attorney, Agent, or Firm* — Slater Matsil, LLP

(57) ABSTRACT

A user equipment (UE) in a frame based equipment (FBE) mode may determine that a communication channel in an unlicensed spectrum is available for use, and transmit, in the communication channel, a transmission to a gNB in a fixed frame period (FFP) associated with the UE to initiate a channel occupancy time (COT) by the UE in the FFP. The transmission starts at the beginning of the FFP and ends before an idle period within the FFP. The gNB receives the transmission and, based thereon, determines that the UE has initiated the COT. The gNB may acknowledge or reject initiation of the COT by the UE.

27 Claims, 15 Drawing Sheets

2200

2210 — DETERMINE THAT A COMMUNICATION CHANNEL IN AN UNLICENSED SPECTRUM IS AVAILABLE

2220 — TRANSMIT, IN THE COMMUNICATION CHANNEL, A FIRST TRANSMISSION TO A gNB IN A FIRST FIXED FRAME PERIOD (FFP) ASSOCIATED WITH THE UE TO INITIATE A FIRST CHANNEL OCCUPANCY TIME (COT) BY THE UE IN THE FIRST FFP

(56) References Cited

U.S. PATENT DOCUMENTS

| | | | | |
|---|---|---|---|---|
| 2021/0360421 A1* | 11/2021 | Wang | .................. | H04W 74/006 |
| 2022/0182879 A1* | 6/2022 | Fehrenbach | .......... | H04W 28/06 |
| 2022/0416953 A1* | 12/2022 | Li | ......................... | H04L 1/1861 |
| 2023/0189328 A1* | 6/2023 | Xu | .................... | H04W 74/0808 |
| | | | | 370/329 |
| 2023/0319885 A1* | 10/2023 | Bagheri | ................. | H04L 1/189 |
| | | | | 370/329 |
| 2023/0354275 A1* | 11/2023 | Moon | .............. | H04W 74/0808 |

OTHER PUBLICATIONS

Nokia, et al., "Feature Lead's Summary #2 on Channel Access Procedures", 3GPP TSG RAN WG1 Meeting #98bis, R1-1911706, Oct. 14-20, 2019, 27 pages, Chongqing, P.R. China.
Nokia et al., "Feature Lead's Summary #2 on Channel Access Procedures," 3GPP TSG RAN WG1 Meeting #98bis, R1-1911706, Chongqing,P.R. China, Oct. 14-20, 2019, total 27 pages, XP051798948.

* cited by examiner

1500

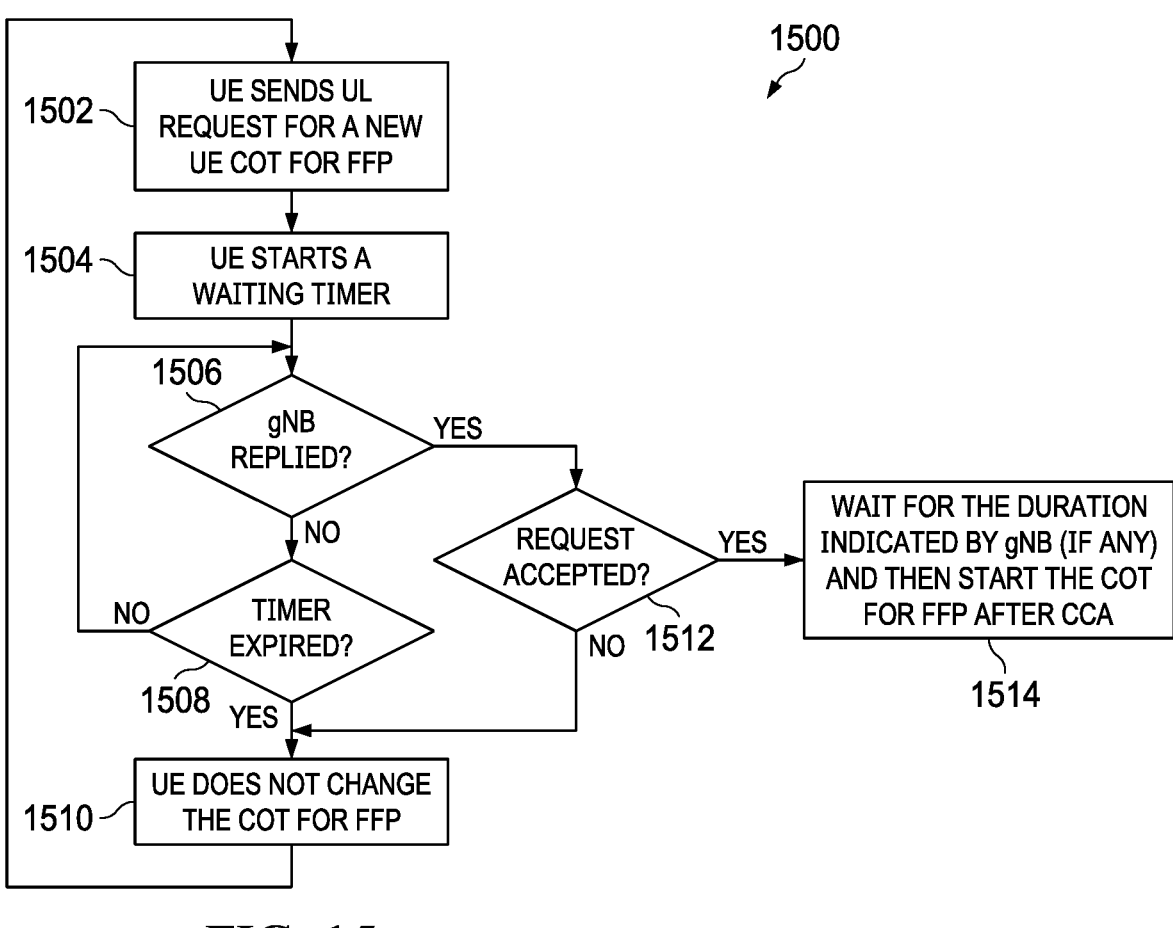

```
SemiStaticChannelAccessConfig ::=        SEQUENCE {
    Offset                                  ENUMERATED { ms1, ms2, ms2dot5, ms4, ms5, ms10}
    period                                  ENUMERATED {ms1, ms2, ms2dot5, ms4, ms5, ms10}
    MCOT                                    ENUMERATED {80%,85%,90%,95%}}
SemiStaticChannelAccessConfig_UE_List ::= SEQUENCE {1,2,..,MaxNrofConfigurations} of
SemiStaticAccessConfig-ID
SemiStaticChannelAccessConfig_gNB_List ::= SEQUENCE {1,2,..,MaxNrofConfigurations} of
SemiStaticAccessConfig-ID
```

FIG. 16

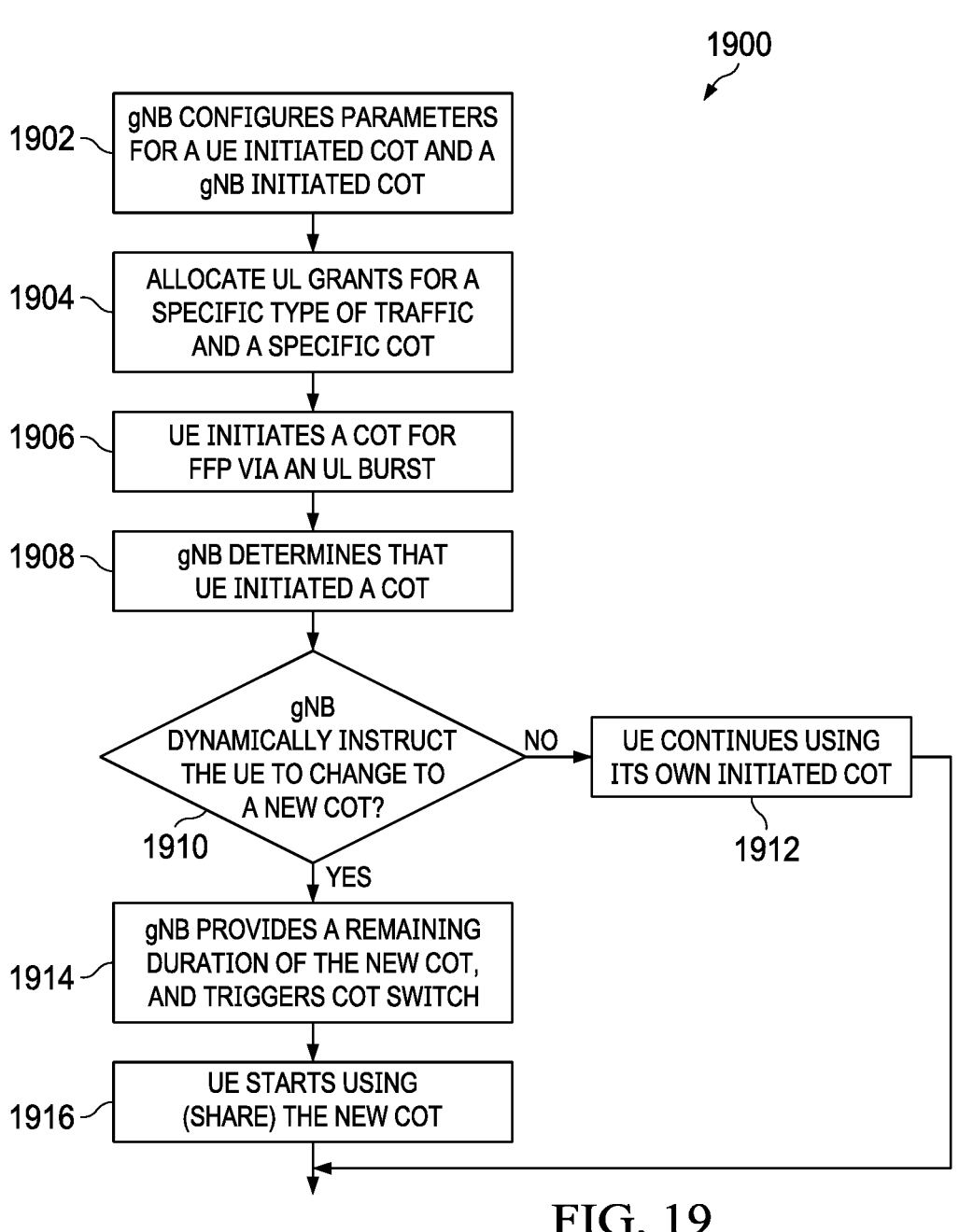

1900

1902 — gNB CONFIGURES PARAMETERS FOR A UE INITIATED COT AND A gNB INITIATED COT

1904 — ALLOCATE UL GRANTS FOR A SPECIFIC TYPE OF TRAFFIC AND A SPECIFIC COT

1906 — UE INITIATES A COT FOR FFP VIA AN UL BURST

1908 — gNB DETERMINES THAT UE INITIATED A COT

1910 — gNB DYNAMICALLY INSTRUCT THE UE TO CHANGE TO A NEW COT?

NO → UE CONTINUES USING ITS OWN INITIATED COT — 1912

YES

1914 — gNB PROVIDES A REMAINING DURATION OF THE NEW COT, AND TRIGGERS COT SWITCH

1916 — UE STARTS USING (SHARE) THE NEW COT

FIG. 19

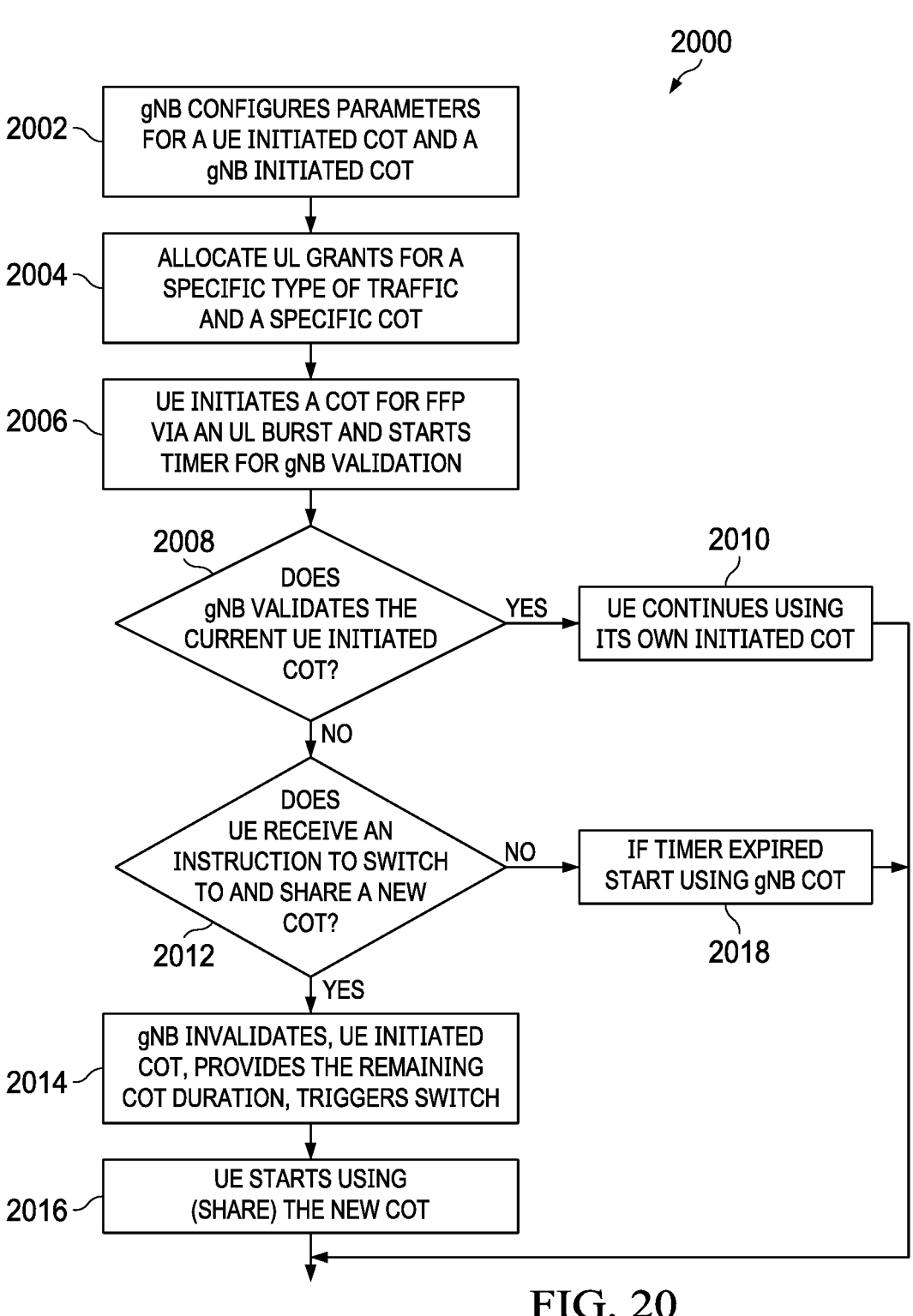

2000

2002 — gNB CONFIGURES PARAMETERS FOR A UE INITIATED COT AND A gNB INITIATED COT

2004 — ALLOCATE UL GRANTS FOR A SPECIFIC TYPE OF TRAFFIC AND A SPECIFIC COT

2006 — UE INITIATES A COT FOR FFP VIA AN UL BURST AND STARTS TIMER FOR gNB VALIDATION

2008 — DOES gNB VALIDATES THE CURRENT UE INITIATED COT?

YES → 2010 UE CONTINUES USING ITS OWN INITIATED COT

NO

DOES UE RECEIVE AN INSTRUCTION TO SWITCH TO AND SHARE A NEW COT? 2012

NO → IF TIMER EXPIRED START USING gNB COT 2018

YES

2014 — gNB INVALIDATES, UE INITIATED COT, PROVIDES THE REMAINING COT DURATION, TRIGGERS SWITCH

2016 — UE STARTS USING (SHARE) THE NEW COT

METHOD AND APPARATUS FOR UE INITIATED COT FOR FBE

CROSS-REFERENCE TO RELATED APPLICATIONS

This patent application is a continuation of International Patent Application No. PCT/US2021/044718, filed on Aug. 5, 2021 and entitled "Method and Apparatus for UE initiated COT for FBE," which claims priority to U.S. Provisional Application No. 63/062,193, filed on Aug. 6, 2020 and entitled "Method and Apparatus for UE initiated channel occupation time for frame based equipment," and U.S. Provisional Application No. 63/104,318, filed on Oct. 22, 2020 and entitled "Method and Apparatus for UE initiated COT for FBE," which applications are hereby incorporated by reference herein as if reproduced in their entireties.

TECHNICAL FIELD

The present disclosure relates generally to wireless communications, and in particular embodiments, to techniques and mechanisms for UE initiated channel occupancy time (COT) for frame based equipment (FBE).

BACKGROUND

Licensed exempt spectrum, also known as unlicensed spectrum or shared spectrum, has recently attracted a lot of interest from cellular operators. Long Term Evolution licensed assisted access (LTE-LAA) was specified in 3GPP LTE releases (Rel) 13 and 14. More recently in New Radio Unlicensed (NR-U), the operation in unlicensed spectrum (or shared spectrum) was specified in release 16 (3GPP TS 38.213, which is hereby incorporated herein by reference in its entirety) for 3GPP New Radio (NR).

3GPP and IEEE technologies operating in unlicensed spectrum use listen before talk (LBT) channel access. In certain regions, such as European Union (EU) and Japan, a LBT rule is generally enforced by spectrum regulators to reduce interference risks and to offer a fairer coexistence mechanism. The LBT mechanism requires a transmitter to check, before a transmission, if there are other occupants of a channel and postpone the transmission if the channel is occupied.

In particular, the LBT rule in EU, specified in European Telecommunications Standards Institute (ETSI) European Standard (EN) 301 893 for 5 GHz band, uses clear channel assessment (CCA) to determine if a channel is available for transmission. CCA checks if energy received on a channel is above a CCA threshold. If the energy detected exceeds a CCA threshold, the channel is considered in use (busy), otherwise, the channel is considered idle. If the channel is idle, a transmitter can transmit for a duration of a channel occupancy time (COT) in a bandwidth that is at least a portion, e.g., 80%, of a total channel bandwidth. The maximum COT duration for a transmission burst is also specified in ETSI EN 301 893 V2.1.1 (2017-05), which is hereby incorporated herein by reference in its entirety. The maximum COT (MCOT) duration adopted in 3GPP NR-U Rel 16 (TS 37.213, which is hereby incorporated herein by reference in its entirety) is a function of a channel access priority class (CAPC). As defined in TS 37.213, for determining a COT, if a transmission gap (an interval between consecutive transmissions) is less than or equal to 25 us (microseconds), the transmission gap duration is counted in the COT. A transmission burst is defined as a set of transmissions with gaps (i.e., transmission gaps) no more than 16 us, and if the gaps are greater than 16 us, the set of transmissions are considered separate.

3GPP Rel 16 (TS 37.213) defines several types of channel access in unlicensed spectrum, for downlink (DL) and uplink (UL).

In Type 1 DL channel access, a gNB may transmit after first sensing a channel to be idle during sensing slot durations of a defer duration $T_d$ and after a randomly initiated counter N, which is decremented in each idle sensing slot, is zero. A sensing slot duration is 9 us. Type 1 DL channel access is used before starting a new COT, where the COT duration can be up to 10 ms depending on traffic priority.

Type 2 DL channel access includes a deterministic duration of channel sensing, during which a channel needs to be sensed as idle. Type 2 DL channel access includes Type 2A, Type 2B and Type 2C channel accesses.

Type 2A channel access allows a transmission if the channel is sensed idle for at least a sensing interval of 25 us prior to transmission.

Type 2B channel access allows a transmission if the channel is sensed idle for at least a sensing interval of 16 us prior to transmission.

Type 2C channel access allows a transmission for a duration of no more than 584 us without channel sensing prior to transmission.

Type 2A DL channel access procedures are applicable in shared COT following a user equipment (UE) transmission, and for transmissions that includes a discovery burst with a duration of at most 1 ms and a duty cycle at most ½₀.

Type 2B or Type 2C DL channel access procedures are applicable following transmission(s) by a UE after a gap of 16 us or up to 16 us, respectively, in a shared channel occupancy.

Similarly to the DL channel access types, TS 37.213 defines UL channel access procedures, where Type 1 UL channel access is based on sensing channel being idle for a fixed defer duration (Td) and then until a random backoff counter N decremented for each idle sensing slot reaches zero, as in Type 1 DL channel access. Type 2 UL channel access requires that the channel to be sensed as idle for a fixed (deterministic) duration before transmissions, where Type 2A UL channel access requires at least a 25 us channel idle duration before transmission, and Type 2B UL channel access requires at least a 16 us of channel idle duration before transmissions. Type 2C allows for transmissions of at most 584 us length without any channel sensing.

SUMMARY

Technical advantages are generally achieved, by embodiments of this disclosure which describe a method and apparatus for receiver assisted transmission in shared spectrum.

According to one aspect of the present disclosure, a method is provided that includes: determining, by a user equipment (UE) in a frame based equipment (FBE) mode, that a communication channel in an unlicensed spectrum is available for use; and transmitting, by the UE in the communication channel, a first transmission to a gNB in a fixed frame period (FFP) associated with the UE to initiate a first channel occupancy time (COT) by the UE in the FFP, the first transmission starting at beginning of the FFP and ending before an idle period within the FFP.

Optionally, in any of the preceding aspects, determining that the communication channel is available comprises: performing, by the UE, a clear channel assessment (CCA).

Optionally, in any of the preceding aspects, determining that the communication channel is available comprises: starting, by the UE, a backoff counter after the CCA succeeds; and determining, by the UE, that the communication channel is available when the backoff counter is decremented to zero (0).

Optionally, in any of the preceding aspects, the first transmission includes a physical uplink control channel (PUCCH), a physical uplink shared channel (PUSCH), channel state information (CSI), a scheduling request (SR), a random access preamble, or a sounding reference signal (SRS).

Optionally, in any of the preceding aspects, the first transmission occupies an entire or a part of a frequency bandwidth of the communication channel.

Optionally, in any of the preceding aspects, the method further includes: receiving, by the UE, information of a time interval (T_UE_COT) during which the UE is allowed to initiate periodic COTs, the time interval T_UE_COT comprising the FFP.

Optionally, in any of the preceding aspects, the first COT is a periodic COT initiated by the UE.

Optionally, in any of the preceding aspects, the method further includes: receiving, by the UE, a configuration configuring the UE to initiate a semi-static COT in the communication channel.

Optionally, in any of the preceding aspects, the method further includes: receiving, by the UE, configuration information of the first COT, the configuration information of the first COT comprising one or more of: a COT index of the first COT; a periodicity of the FFP; a maximum allowed COT duration in the FFP (MCOT); a time offset of the FFP; a min idle duration in the FFP; a max idle duration in the FFP; an offset of the FFP; or frequency resources for uplink transmissions during the first COT.

Optionally, in any of the preceding aspects, the offset of the FFP or a starting position of the FFP is relative to a boundary of a radio frame of an even index number.

Optionally, in any of the preceding aspects, the periodicity of the FFP comprises a value in millisecond (ms) of $\{1, 2, 2.5, 4, 5, 10\}$.

Optionally, in any of the preceding aspects, the periodicity of the FFP comprises any one value in millisecond (ms) of $\{1, 2, 2.5, 4, 5, 10\}$ or a subset values of $\{1, 2, 2.5, 4, 5, 10\}$, according to capability of the UE to initiate COTs.

Optionally, in any of the preceding aspects, the periodicity is in a range of 1 ms to 10 ms.

Optionally, in any of the preceding aspects, the configuration information is received through dedicated RRC signaling.

Optionally, in any of the preceding aspects, the method further includes: receiving, by the UE, information of a listen before talk (LBT) type for sensing the communication channel.

Optionally, in any of the preceding aspects, the method further includes: receiving, by the UE from the gNB in response to sending the first transmission, an indication indicating whether initiation of the first COT of the UE is acknowledged or rejected.

Optionally, in any of the preceding aspects, the method further includes: determining, by the UE, that initiation of the first COT of the UE is acknowledged upon receiving a transmission from the gNB within a time period after sending the first transmission, or that the initiation of the first COT is rejected when no transmission is received from the gNB within the time period.

Optionally, in any of the preceding aspects, the method further includes: performing, by the UE, uplink transmissions in the first COT when the initiation of the first COT of the UE is acknowledged.

Optionally, in any of the preceding aspects, the method further includes: performing, by the UE, uplink transmissions in a second COT initiated by the gNB when the initiation of the first COT of the UE is rejected.

Optionally, in any of the preceding aspects, the method further includes: sending, by the UE to the gNB, a request requesting for a new COT to be used by the UE, the new COT requested is a UE initiated COT.

Optionally, in any of the preceding aspects, the method further includes: starting, by the UE after sending the request, a timer; and receiving, by the UE from the gNB before the timer expires, an indication indicating that the request is accepted, and performing, by the UE, transmissions in the new COT; or sending, by the UE to the gNB, another request for the new COT when the request is not accepted by the gNB before the timer expires.

Optionally, in any of the preceding aspects, the request is sent in a third COT having been initiated by the gNB or having been initiated by the UE.

Optionally, in any of the preceding aspects, the request comprises parameters of the new COT.

Optionally, in any of the preceding aspects, the method further includes: receiving, by the UE during the first COT, signaling instructing the UE to switch from transmitting according to the first COT to transmitting according to a fourth COT.

Optionally, in any of the preceding aspects, the signaling comprises information of a remaining duration of the fourth COT.

Optionally, in any of the preceding aspects, the method further includes: starting, by the UE, a transition timer after receiving the signaling.

Optionally, in any of the preceding aspects, the method further includes: continuing to perform, by the UE, transmissions in the first COT in response to the fourth COT ending before the transition timer expires.

Optionally, in any of the preceding aspects, the method further includes: switching, by the UE, to use the fourth COT for transmission after the transition timer expires.

Optionally, in any of the preceding aspects, the fourth COT is a UE initiated COT, and the method further comprises: initiating, by the UE, the fourth COT in a next FFP.

Optionally, in any of the preceding aspects, the fourth COT is a gNB initiated COT, and the method further comprises: monitoring and sharing, by the UE, the fourth COT in a next FFP.

Optionally, in any of the preceding aspects, the method further includes: transmitting, by the UE, capability information indicating capability of the UE to initiate COTs.

According to another aspect of the present disclosure, a method is provided that includes receiving, by a gNB from a user equipment (UE) in a communication channel of an unlicensed spectrum, a first transmission in a fixed frame period (FFP), the UE in a frame based equipment (FBE) mode; and determining, by the gNB based on the first transmission, that the UE initiates a first channel occupancy time (COT) in the FFP in response to the first transmission starting at beginning of the FFP and ending before an idle period of the FFP.

Optionally, in any of the preceding aspects, the first transmission includes a PUCCH, a PUSCH based on a configured grant, channel state information (CSI), a scheduling request (SR), a random access preamble, or a sounding reference signal (SRS).

Optionally, in any of the preceding aspects, the first transmission occupies an entire or a part of a frequency bandwidth of the communication channel.

Optionally, in any of the preceding aspects, the method further includes: transmitting, by the gNB to the UE, information of a time interval (T_UE_COT) during which the UE is allowed to initiate periodic COTs, the time interval T_UE_COT comprising the FFP.

Optionally, in any of the preceding aspects, the method further includes: transmitting, by the gNB to the UE, a configuration configuring the UE to initiate a semi-static COT in the communication channel.

Optionally, in any of the preceding aspects, the method further includes: transmitting, by the UE, configuration information of the first COT, the configuration information of the first COT comprising one or more of: a COT index of the first COT; a periodicity of the FFP; a maximum allowed COT duration in the FFP (MCOT); a time offset of the FFP; a min idle duration in the FFP; a max idle duration in the FFP; an offset of the FFP; or frequency resources for uplink transmissions during the first COT.

Optionally, in any of the preceding aspects, the offset of the FFP or a starting position of the FFP is relative to a boundary of a radio frame of an even index number.

Optionally, in any of the preceding aspects, the method further includes: sending, by the gNB to the UE in response to receiving the first transmission, an indication indicating whether initiation of the first COT of the UE is acknowledged or rejected.

Optionally, in any of the preceding aspects, the indication is carried in a PDCCH, DCI, or a HARQ_ACK.

Optionally, in any of the preceding aspects, the method further includes: sending, by the gNB in response to receiving the first transmission, a transmission to the UE within a time period to acknowledge initiation of the first COT; or performing, by the gNB, no downlink transmission to the UE within the time period to indicate that the initiation of the first COT is rejected.

Optionally, in any of the preceding aspects, the method further includes: receiving, by the gNB from the UE, a request requesting for a new COT to be used by the UE, the new COT requested being a UE initiated COT.

Optionally, in any of the preceding aspects, the method further includes: indicating, by the gNB to the UE, whether the request is accepted.

Optionally, in any of the preceding aspects, the request is received in a third COT having been initiated by the gNB or having been initiated by the UE.

Optionally, in any of the preceding aspects, the request comprises parameters of the new COT.

Optionally, in any of the preceding aspects, the method further includes: transmitting, by the gNB to the UE during the first COT, signaling instructing the UE to switch from transmitting according to the first COT to transmitting according to a fourth COT.

Optionally, in any of the preceding aspects, the signaling comprises information of a remaining duration of the fourth COT.

Optionally, in any of the preceding aspects, the fourth COT is a gNB initiated COT or a UE initiated COT.

Optionally, in any of the preceding aspects, the method further includes: receiving, by the gNB from the UE, capability information indicating capability of the UE to initiate COTs.

Optionally, in any of the preceding aspects, the method further includes: receiving, by the gNB from a plurality of UEs in the communication channel, a plurality of transmissions of the respective UEs in the FFP, each transmission of the plurality of transmissions starting at beginning of the FFP and ending before the idle period of the FFP; determining, by the gNB, that each of the plurality of UEs initiates the first COT in the FFP; acknowledging, by the gNB, the first COT initiated by the UE; and rejecting, by the gNB, the first COT initiated by other UEs of the plurality of UEs.

Optionally, in any of the preceding aspects, the method further includes: canceling, by the gNB, the first COT that is initiated by the UE in the FFP.

According to another embodiment of the present disclosure, a system is provided that includes: a user equipment (UE) in a frame based equipment (FBE) mode; and a gNB in communication with the UE. The UE is configured to perform: determining that a communication channel in an unlicensed spectrum is available for use; and transmitting, in the communication channel, a first transmission to the gNB in a fixed frame period (FFP) associated with the UE to initiate a first channel occupancy time (COT) by the UE in the FFP, the first transmission starting at the beginning of the FFP and ending before an idle period within the FFP. The gNB is configured to perform: receiving, from the UE in the communication channel of the unlicensed spectrum, the first transmission in the FFP; and determining, based on the first transmission, that the UE initiates the first COT in the FFP in response to the first transmission starting at the beginning of the FFP and ending before an idle period of the FFP.

According to another embodiment of the present disclosure, an apparatus is provided that includes a non-transitory memory storage comprising instructions; and one or more processors in communication with the memory storage, wherein the instructions, when executed by the one or more processors, cause the apparatus to perform a method of any of the preceding aspects.

According to another embodiment of the present disclosure, a non-transitory computer-readable media is provided, which stores computer instructions that when executed by one or more processors of an apparatus, cause the apparatus to perform a method of any of the preceding aspects.

The above aspects of the present disclosure facilitate communications of a UE in the FBE mode in the unlicensed spectrum, with reduced transmission delays, overhead and battery power consumption.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 15 is a flowchart of embodiment UE operations for requesting a new UE COT;

FIG. 16 is an embodiment semi-static channel access configuration information element (IE);

FIG. 19 is a flowchart of embodiment UE and gNB operations for channel access, highlighting dynamic COT change;

FIG. 20 is a flowchart of embodiment UE and gNB operations for channel access, highlighting validation of UE COT initiation;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
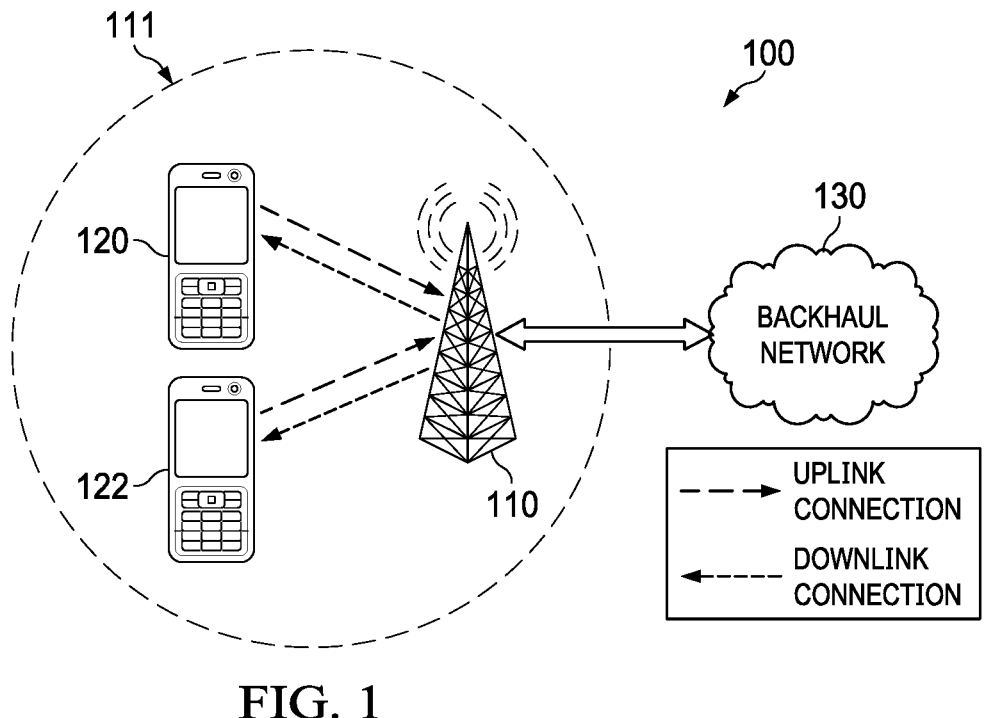
FIG. 1 is a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Communications in unlicensed spectrum use listen before talk (LBT) channel access. A transmitter performs clear channel assessment (CCA) to determine if a channel is available for transmission. If the channel is assessed available, the transmitter can transmit in a duration of a channel occupancy time (COT). A COT is a time duration during which a communication device, e.g., a user equipment (UE) or a gNB, can have transmissions on a given channel without re-evaluating the availability of that channel. During the COT, the communication device may have multiple transmissions, and may allow other communication devices to share the COT (i.e., to transmit during the shared COT). Conventionally, only a gNB can initiate a COT (i.e., the gNB is the one that first transmit in the COT), and the gNB may share the COT with UEs. A UE in a frame based equipment (FBE) operation mode cannot initiate a COT, and needs to use a COT that is shared by a gNB for transmissions. The gNB may schedule an uplink grant in the gNB initiated COT for uplink transmissions of the UE.

The restriction that only gNB can initiate a COT can lead to unnecessary delays and overhead for UL transmissions. As an example, a UE having UL data to transmit may have to wait until a gNB scheduled COT begins. When the UE has no data transmission, the UE may still need to monitor each scheduled COT, which leads to UE battery power and RF spectrum waste.

Embodiments of the present disclosure provide a method for a UE initiated COT in the FBE operation mode. In some embodiments, a UE in the FBE mode may determine that a communication channel in an unlicensed spectrum is available for use, and transmit, in the communication channel, a transmission to a gNB in a fixed frame period (FFP) associated with the UE to initiate a channel occupancy time (COT) in the FFP by the UE. The transmission starts at the beginning of the FFP and ends before an idle period within the FFP. The gNB receives the transmission, and determines, based on receipt of the transmission, that the UE has initiated the COT. That is, the UE is the one that first transmits in the COT. The gNB may acknowledge or reject initiation of the COT by the UE. If the gNB does not reject the initiation, the UE may continue to communicate with the gNB in the UE initiated COT. The UE does not need to re-evaluate the channel availability during the UE initiated COT. Thus, when UE has uplink data to transmit, the UE does not need to wait to share a gNB initiated COT to transmit the uplink data in the gNB initiated COT. The UE may initiate a COT by itself for transmitting the uplink data. The embodiments facilitate communications of a UE in the FBE mode in an unlicensed spectrum, with reduced delays, overhead and battery power consumption.

FIG. 1 illustrates an example wireless communication system 100. Communication system 100 includes an access node 110 with coverage area 111. Access node 110 serves a plurality of user equipments (UEs), including UE 120 and UE 122. Transmissions from access node 110 to a UE is referred to as a downlink (DL) transmission and occurs over a downlink channel (shown in FIG. 1 as a solid arrowed line), while transmissions from a UE to access node 110 is referred to as an uplink (UL) transmission and occurs over an uplink channel (shown in FIG. 1 as a dashed arrowed line). Services may be provided to the plurality of UEs by service providers connected to access node 110 through a backhaul network 130, such as the Internet. The wireless communication system 100 may include multiple distributed access nodes 110.

In a typical communications system, there are several operating modes. In a cellular operating mode, communications to and from the plurality of UEs go through access node 110, while in device to device communications mode, such as proximity services (ProSe) operating mode, for example, direct communication between UEs is possible. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, relays, customer premises equipment (CPE), and so on. UEs may also be commonly referred to as mobile stations, mobiles, terminals, terminal devices, users, subscribers, stations, communication devices, CPEs, relays, Integrated Access and Backhaul (IAB) relays, and the like. It is noted that when relaying is used (based on relays, picos, CPEs, and so on), especially multihop relaying, the boundary between a controller and node controlled by the controller may become blurry, and a dual node (either the controller or the node controlled by the controller) deployment where a first node that provides configuration or control information to a second node is considered to be the controller. Likewise, the concept of UL and DL transmissions can be extended as well.

A cell may include one or more bandwidth parts (BWPs) for UL or DL allocated for a UE. Each BWP may have its own BWP-specific numerology and configuration. It is noted that not all BWPs need to be active at the same time for the UE. A cell may correspond to one or more carriers. Typically, one cell (a primary cell (PCell) or a secondary cell (SCell), for example) is a component carrier (a primary component carrier (PCC) or a secondary CC (SCC), for example). For some cells, each cell may include multiple carriers in UL, one carrier is referred to as an UL carrier or non-supplementary (non-SUL) UL carrier which has an associated DL, and other carriers are called supplementary UL (SUL) carriers which do not have an associated DL. A cell, or a carrier, may be configured with slot or subframe formats comprised of DL and UL symbols, and that cell or carrier is seen as operating in a time division duplexed (TDD) mode. In general, for unpaired spectrum, the cells or carriers are in TDD mode, and for paired spectrum, the cells or carrier are in a frequency division duplexed (FDD) mode. Access nodes may provide wireless access in accordance with one or more wireless communication protocols, e.g., long term evolution (LTE), LTE advanced (LTE-A), 5G, 5G LTE, 5G NR, High Speed Packet Access (HSPA), Wi-Fi 802.11a/b/g/n/ac, etc. While it is understood that communications systems may employ multiple access nodes capable of communicating with a number of UEs, only one access node, and two UEs are illustrated for simplicity.

Figure 2:
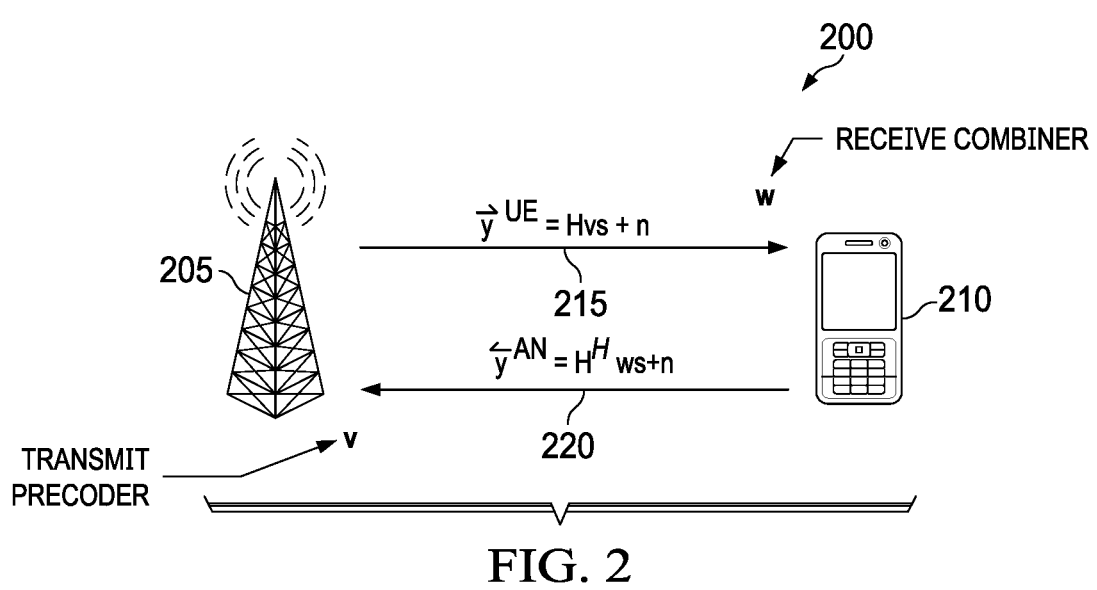
FIG. 2 is an embodiment communications system, providing mathematical expressions of signals transmitted in the communications system.

FIG. 2 illustrates an example communications system 200, providing mathematical expressions of signals transmitted in the communications system 200. Communications system 200 includes an access node 205 communicating with a UE 210. As shown in FIG. 2, access node 205 is using a transmit filter v and UE 210 is using a receive filter w. Both access node 205 and UE 210 use linear precoding or combining. Assuming a channel matrix (or channel model or channel response) H is an $N_{rx} \times N_{tx}$ matrix of a multiple-input multiple-output (MIMO) system, i.e., there are $N_{tx}$ transmit antennas and $N_{rx}$ receive antennas. The transmit filter v of dimension $N_{tx} \times Ns$ enables the transmitter to precode or beamform the transmitted signal, where Ns is the number of layers, ports, streams, symbols, pilots, messages, data, or known sequences transmitted. The receive filter w of multi-antenna systems is of dimension $N_{rx} \times Ns$ and represents the combining matrix, which is usually applied on the received signal y according to $w^H y$. The above description is for a transmission from access node 205 to UE 210, i.e., a DL transmission. The transmission may also occur at the reverse direction (an UL transmission), for which the channel matrix becomes $H^H$ in the case of TDD (where $H^H$ is the Hermitian of channel model H), and w may be seen as the transmit filter and v as the receiver filter. The w for transmission and the w for reception may or may not be the same, and likewise for v.

A DL (or forward) channel 215 between access node 205 and UE 210 has channel model or response H, while an UL (or backward, or reverse) channel 220 between UE 210 and access node 205 has channel model or response $H^H$. (Another convention is that the UL channel is denoted as $H^T$, which is the transposition of channel model H). Although FIG. 2 depicts only one access node and one UE, communication system 200 is not limited to this case. Multiple UEs may be served by the access node, on different time-frequency resources (such as in frequency division multiplexed-time division multiplexed (FDM-TDM) communication systems, as in typical cellular systems) or on the same time-frequency resources (such as in multi-user MIMO (MU-MIMO) communication systems, wherein multiple UEs are paired together and transmissions to each UE are individually precoded). Among the paired UEs, there is intra-cell interference.

Also, multiple access nodes may exist in the network, some of which may be cooperatively serving UE 210 in a joint transmission fashion (such as in coherent joint transmission, non-coherent joint transmission, coordinated multipoint transmission, etc.), a dynamic point switching fashion, and so on. Some other access nodes may not serve UE 210 and their transmissions to their own UEs cause inter-cell interference to UE 210. The scenario of multiple access nodes and multiple UEs, with access node cooperation to serve a UE and with MU-MIMO, is an example scenario considered herein.

A way to increase the network resources may be to utilize more and more usable spectrum resources, which include not only the licensed spectrum resources of the same type as a macro, but also the licensed spectrum resources of a different type than the macro (e.g., the macro is a FDD cell but a small cell may use both FDD and TDD carriers), as well as unlicensed spectrum resources and shared-licensed spectrums; and some of the spectrum resources may lie in high-frequency bands, such as 6 GHz to 60 GHz. The unlicensed spectrums may be used by generally any users, subject to regulation requirements. The shared-licensed spectrums may also not be exclusive for an operator to use. Traditionally, the unlicensed spectrums are not used by cellular networks as it is generally difficult to ensure quality of service (QoS) requirements. Operating on the unlicensed spectrums mainly includes wireless local area networks (WLAN), e.g. the Wi-Fi networks. Due to the fact that the licensed spectrum is generally scarce and expensive, utilizing the unlicensed spectrum by a cellular operator may be considered. Note that on high-frequency bands and unlicensed/shared-licensed bands, TDD is typically used and hence channel reciprocity can be exploited for the communications.

On unlicensed spectrums, there is generally no pre-coordination among multiple nodes operating on the same frequency resources. Thus, a contention-based protocol (CBP) may be used. According to Section 90.7 of Part 90 (paragraph 58) of the United States Federal Communication Commission (FCC), CBP is defined as:

"A protocol that allows multiple users to share the same spectrum by defining the events that must occur when two or more transmitters attempt to simultaneously access the same channel and establishing rules by which a transmitter provides reasonable opportunities for other transmitters to operate. Such a protocol may consist of procedures for initiating new transmissions, procedures for determining the state of the channel (available or unavailable), and procedures for managing retransmissions in the event of a busy channel."

Note that the state of a channel being busy may also be called as channel unavailable, channel not clear, channel being occupied, etc., and the state of a channel being idle may also be called as channel available, channel clear, channel not occupied, etc.

One of the most used CBP is the "listen before talk" (LBT) operating procedure in IEEE 802.11 or Wi-Fi (which can be found in, e.g., "Wireless LAN medium access control (MAC) and physical layer (PHY) specifications," IEEE Std. 802.11-2007 (Revision of IEEE Std. 802.11-1999), which is hereby incorporated herein by reference in its entirety). One way to implement Listen Before Talk (LBT) is using the carrier sense multiple access with collision avoidance (CSMA/CA) protocol. According to the CSMA/CA protocol, carrier sensing is performed before any transmission attempt, and a transmission is performed only if a carrier is sensed to be idle, otherwise, if the carrier is busy, a random backoff time for the next sensing is applied. The carrier sensing is generally done through a CCA procedure to determine if the in-channel power is below a given threshold.

ETSI EN 301 893 V2.1.1 (which is hereby incorporated herein by reference in its entirety), Clause 4.9.2, describes two (2) types of Adaptive equipment: Frame Based Equipment and Load Based Equipment, where the following is specified (quoted from ETSI EN 301 893 V2.1.1, Clause 4.9.2).

"Frame Based Equipment shall comply with the following requirements:

1) Before starting transmissions on an Operating Channel, the equipment shall perform a Clear Channel Assessment (CCA) check using "energy detect". The equipment shall observe the Operating Channel(s) for the duration of the CCA observation time which shall be not less than 20 μs. The CCA observation time used by the equipment shall be declared by the manufacturer. The Operating Channel shall be considered occupied if the energy level in the channel exceeds the threshold corresponding to the power level given in point 5 below. If the equipment finds the Operating Channel(s) to be clear, it may transmit immediately (see point 3 below).

2) If the equipment finds an Operating Channel occupied, it shall not transmit on that channel during the next Fixed Frame Period.

NOTE 1: The equipment is allowed to continue Short Control Signaling Transmissions on this channel providing it complies with the requirements in clause 4.9.2.3.

NOTE 2: For equipment having simultaneous transmissions on multiple (adjacent or non-adjacent) Operating Channels, the equipment is allowed to continue transmissions on other Operating Channels providing the CCA check did not detect any signals on those channels.

3) The total time during which an equipment has transmissions on a given channel without re-evaluating the availability of that channel, is defined as the Channel Occupancy Time. The Channel Occupancy Time shall be in the range 1 ms to 10 ms and the minimum Idle Period shall be at least 5% of the Channel Occupancy Time used by the equipment for the current Fixed Frame Period. Towards the end of the Idle Period, the equipment shall perform a new CCA as described in point 1 above.

4) The equipment, upon correct reception of a packet which was intended for this equipment, can skip CCA and immediately (see note 3) proceed with the transmission of management and control frames (e.g. ACK and Block ACK frames). A consecutive sequence of such transmissions by the equipment, without it performing a new CCA, shall not exceed the Maximum Channel Occupancy Time as defined in point 3 above.

NOTE 3: For the purpose of multi-cast, the ACK transmissions (associated with the same data packet) of the individual devices are allowed to take place in a sequence.

5) The energy detection threshold for the CCA shall be proportional to the maximum transmit power (PH) of the transmitter: for a 23 dBm effective isotropically radiated power (e.i.r.p.) transmitter, the CCA threshold level (TL) shall be equal or lower than −73 dBm/MHz at the input to the receiver (assuming a 0 dBi receive antenna). For other transmit power levels, the CCA threshold level TL shall be calculated using the formula: $TL = -73\ dBm/MHz + 23 - PH$ (assuming a 0 (zero) dBi receive antenna and PH specified in dBm e.i.r.p.)."

"Load based Equipment may implement an LBT based spectrum sharing mechanism based on the Clear Channel Assessment (CCA) mode using "energy detect", as described in IEEE 802.11™-2007 [9], clauses 9 and 17, in IEEE 802.11™-2009 [10], clauses 9, 11 and 20 providing they comply with the conformance requirements referred to in clause 4.9.3 (see note 1) (all of which are hereby incorporated herein by reference).

NOTE 1: It is intended also to allow a mechanism based on the Clear Channel Assessment (CCA) mode using "energy detect" as described in IEEE 802.11ac™ [i.2], clauses 8, 9, 10 and 22 (which are hereby incorporated herein by reference), when this becomes available.

Load Based Equipment not using any of the mechanisms referenced above shall comply with the following minimum set of requirements:

1) Before a transmission or a burst of transmissions on an Operating Channel, the equipment shall perform a Clear Channel Assessment (CCA) check using "energy detect". The equipment shall observe the Operating Channel(s) for the duration of the CCA observation time which shall be not less than 20 μs. The CCA observation time used by the equipment shall be declared by the manufacturer. The Operating Channel shall be considered occupied if the energy level in the channel exceeds the threshold corresponding to the power level given in point 5 below. If the equipment finds the channel to be clear, it may transmit immediately (see point 3 below).

2) If the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that need to be observed before initiation of the transmission. The value of N shall be randomly selected in the range 1 . . q every time an Extended CCA is required and the value stored in a counter. The value of q is selected by the manufacturer in the range 4.32. This selected value shall be declared by the manufacturer (see clause 5.3.1 q)). The counter is decremented every time a CCA slot is considered to be "unoccupied". When the counter reaches zero, the equipment may transmit.

NOTE 2: The equipment is allowed to continue Short Control Signaling Transmissions on this channel providing it complies with the requirements in clause 4.9.2.3.

NOTE 3: For equipment having simultaneous transmissions on multiple (adjacent or non-adjacent) operating channels, the equipment is allowed to continue transmissions on other Operating Channels providing the CCA check did not detect any signals on those channels.

3) The total time that an equipment makes use of an Operating Channel is the Maximum Channel Occupancy Time which shall be less than $(13/32) \times q$ ms, with q as defined in point 2 above, after which the device shall perform the Extended CCA described in point 2 above.

4) The equipment, upon correct reception of a packet which was intended for this equipment, can skip CCA and immediately (see note 4) proceed with the transmission of management and control frames (e.g. ACK and Block ACK frames). A consecutive sequence of transmissions by the equipment, without it performing a new CCA, shall not exceed the Maximum Channel Occupancy Time as defined in point 3 above.

NOTE 4: For the purpose of multi-cast, the ACK transmissions (associated with the same data packet) of the individual devices are allowed to take place in a sequence.

5) The energy detection threshold for the CCA shall be proportional to the maximum transmit power (PH) of the transmitter: for a 23 dBm e.i.r.p. transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: $TL=-73 \text{ dBm/MHz}+23-PH$ (assuming a 0 dBi receive antenna and PH specified in dBm e.i.r.p.)."

The above is quoted from ETSI EN 301 893 V2.1.1, Clause 4.9.2.

Figure 3A:
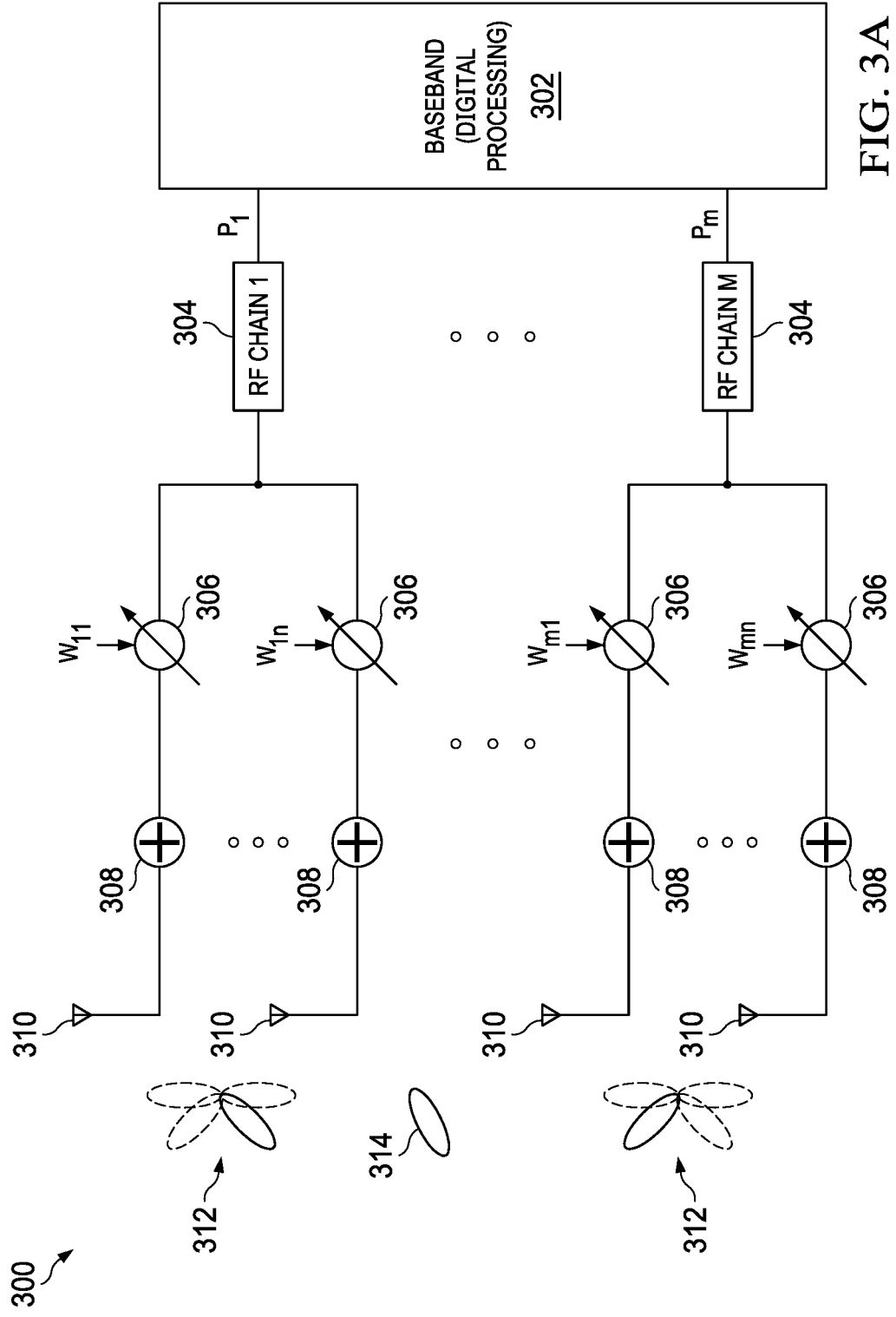
FIGS. 3A and 3B are diagrams of conventional systems for analog beamsteering and digital beamforming.
Figure 3B:
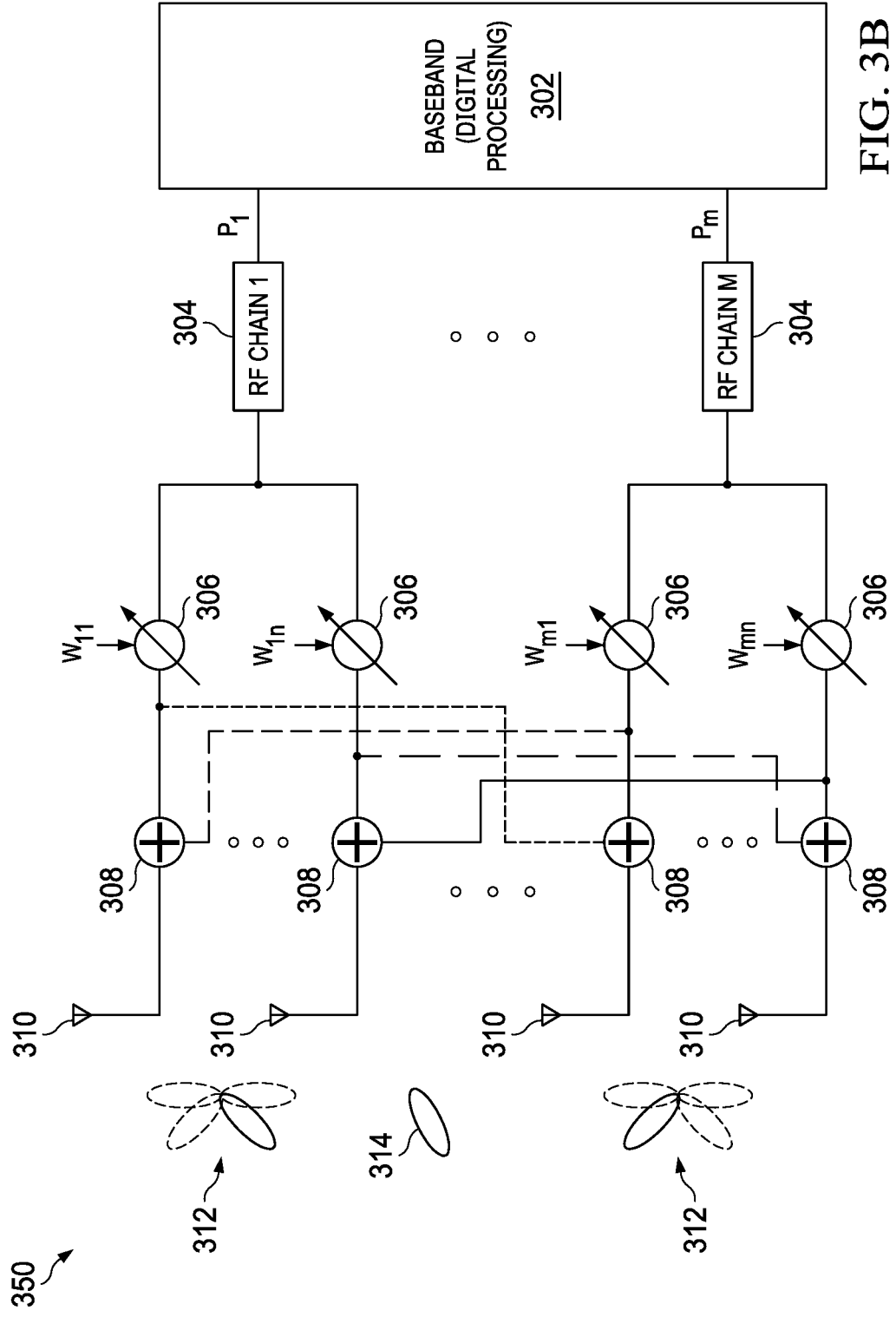

FIGS. 3A and 3B are block diagrams of conventional systems 300 and 350 for analog beamsteering and digital beamforming. System 300 in FIG. 3A includes a baseband component 302 for digital processing, a plurality of RF chain components 304, a plurality of phase shifters 306, a plurality of combiners 308, and a plurality of antennas 310. The system 300 may be used for transmission or receiving. For simplicity, FIG. 3A is illustrated for transmission as an example; receiving may be understood similarly. Each RF chain 304 receives a weighting factor (or weight, p1, . . . , pm as shown in FIG. 3A) from the baseband component 302. The collection of the weighting factors form a digital precoding vector, precoding matrix, beamforming vector, or beamforming matrix for the transmission. For example, a precoding vector may be [p1, . . . , pm]. When multiple layers/streams are transmitted, a precoding matrix may be used by the baseband component 302 to generate the weighting factors, with each column (or row) of the matrix applied to a layer/stream of the transmission. Each RF chain 304 is coupled to a plurality of phase shifters 306. The phase shifters 306 may, theoretically, apply any phase shift values, but generally in practice, only a few possible phase shift values, e.g., 16 or 32 values. Each RF chain 304 generates a narrow beam 312 oriented in a direction determined by the settings on the phase shifters 306 and the combiners 308. If the phase shifters 306 can apply any phase shift values, the beam may point to any direction; but if only a few phase shift values can be used, the beam may be one of a few possibilities (e.g., in FIG. 3A, the narrow beam (in solid line) is selected by setting a specific phase shift value in a RF chain 304, and the beam is among all the possible narrow beams shown as solid line and dotted lines corresponding to all the possible phase shift values). Each RF chain selects such a narrow beam, and all such narrow beams selected by all the RF chains (RF chains 1-N) will be further superposed. How the superposition is done is based on the digital weighting factors. A weighting factor can make a beam from a RF chain stronger or weaker, and therefore, a different set of the factors can generate different superpositions in the spatial domain; in FIG. 3A, a particular beam 314 is illustrated. In other words, by selecting different digital weighting factors, different beams 314 can be generated. Digital operations for beamforming may generally be referred to as (digital) beamforming or precoding, and analog operations for beamforming may generally be referred to as (analog) beamsteering or phase shifting.

System 350 in FIG. 3B is similar to system 300 in FIG. 3A, except that corresponding combiners 308 in each RF chain 304 are connected to one another.

Figure 4:
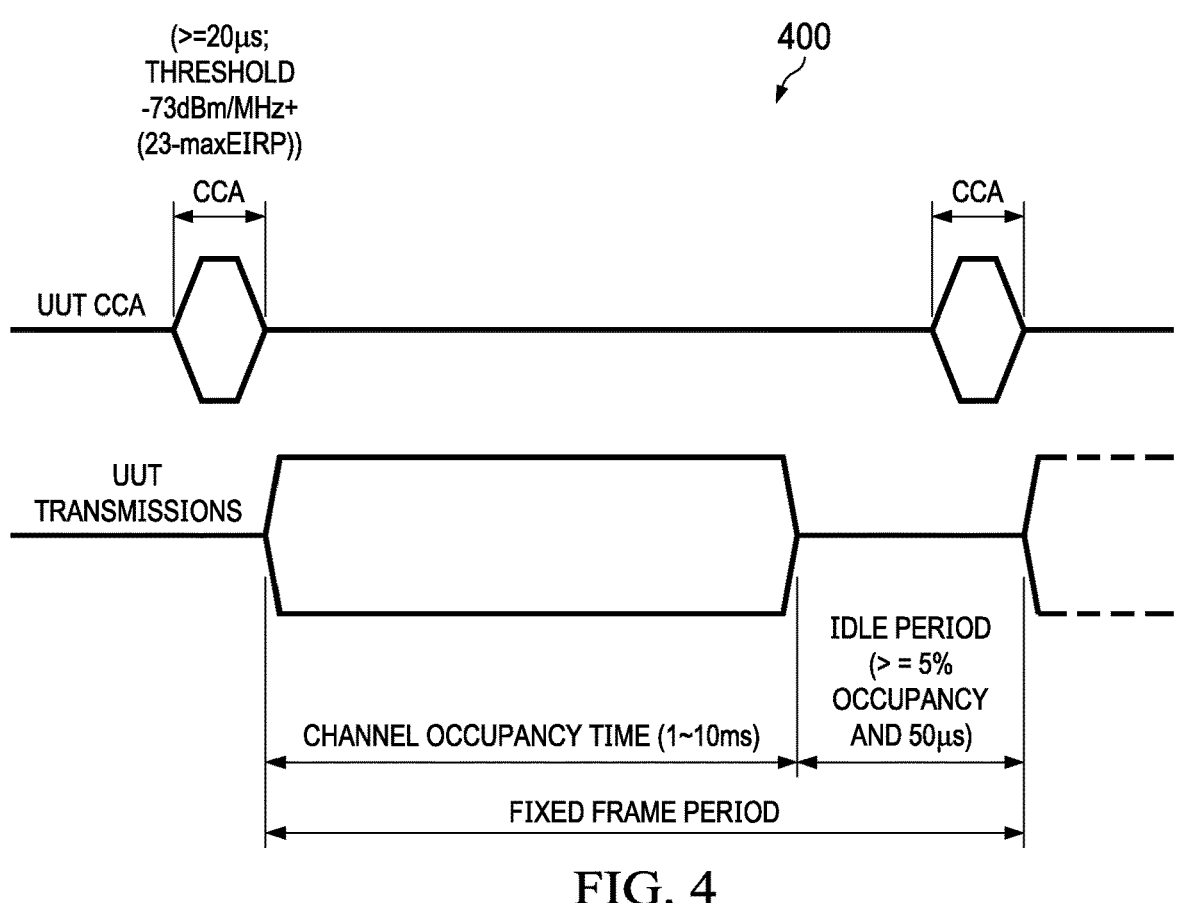
FIG. 4 is a diagram of an example conventional transmission timing of frame based equipment (FBE) operations.

An example of timing 400 for transmissions of a frame based equipment is illustrated in FIG. 4. The equipment, e.g., a unit under test (UUT) performs CCA on a channel before transmission, and when the channel is idle (or available, not occupied), the equipment performs transmission during a channel occupancy time, and enters an idle state for an idle period. During the idle period, the equipment performs CCA to determine whether the channel is available.

Figure 5:
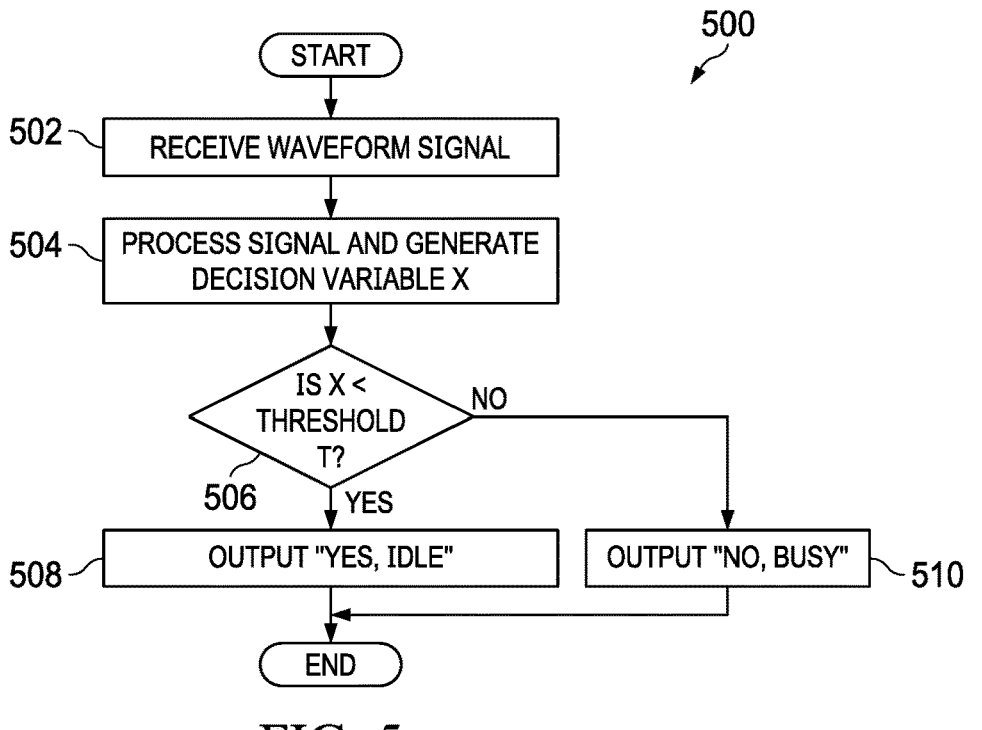
FIG. 5 is a diagram of a conventional carrier sensing method.

An example of a flowchart of an embodiment method 500 for carrier sensing is illustrated in FIG. 5. The method 500 of FIG. 5 begins at block 502 where a communication controller receives a waveform signal from a UE. At block 504, the communication controller processes the signal and generates a decision variable, X. The signal processing herein, generally done in the digital domain which is normally performed in baseband, may include sampling, analog to digital (A/D) conversion, receiver's digital combining with precoding weighting, etc. The decision variable, X, is used to determine whether a carrier channel is idle or busy. At block 506, the communication controller determines whether the decision variable is less than a threshold, T. The threshold may be a standardized value or derived from a standard or some regulation, and may be device type specific, spatial specific, etc. The threshold may also be allowed to change within a specified range according to traffic loads, interference conditions, etc. If, at block 506, the communication controller determines that the value of the decision variable, X, is less than the threshold, T, the method 500 proceeds to block 508 where the communication controller determines that the carrier channel is idle, after which, the method 500 ends. If, at block 506, the communication controller determines that the value of the decision variable, X, is not less than the threshold, T, then the method 500 proceeds to block 510 where the communication controller determines that the carrier channel is busy, after which, the method 500 ends.

Figure 6:
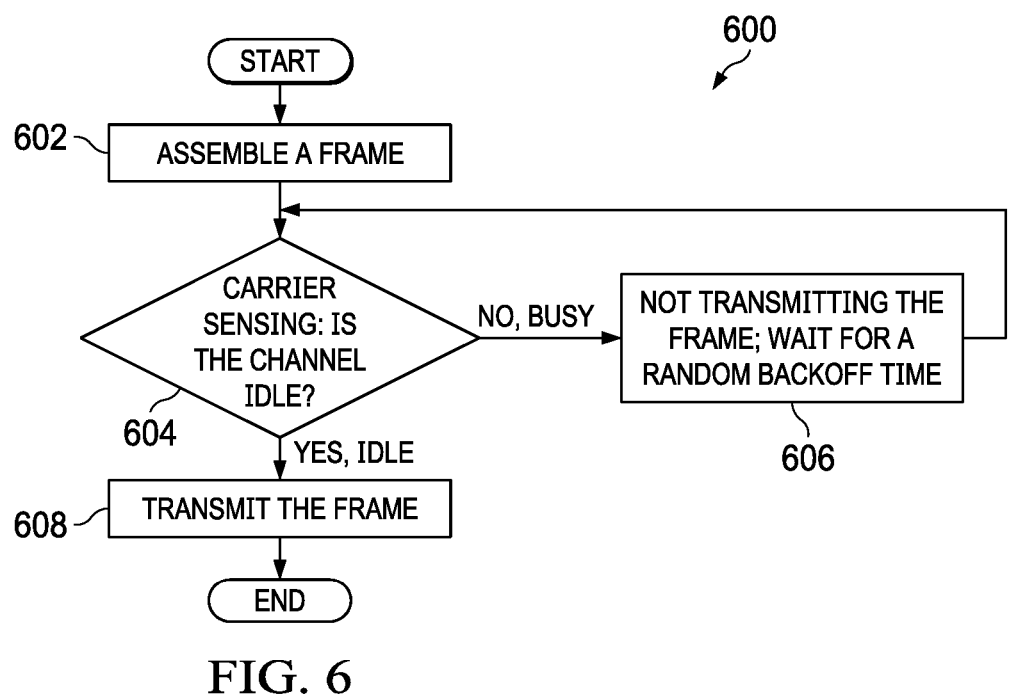
FIG. 6 is a diagram of a conventional listen-before-talk method.

A flow chart of an embodiment method 600 for a general listen-before-talk mechanism is illustrated in FIG. 6. The method 600 of FIG. 6 begins at block 602 where a communication controller assembles a frame. At block 604, the communication controller performs carrier sensing, such as the carrier sensing described above with reference to FIG. 5, to determine if a channel is idle. If, at block 604, the communication controller determines that the channel is not idle, but is busy, then the method 600 proceeds to block 606 where the communication controller refrains from transmitting the frame and waits for a random backoff timer to expire, after which, the method 600 returns to block 604. If, at block 604, the communication controller determines that the channel is idle, then the method 600 proceeds to block 608 where the communication controller transmits the frame, after which, the method 600 ends.

Figure 7:
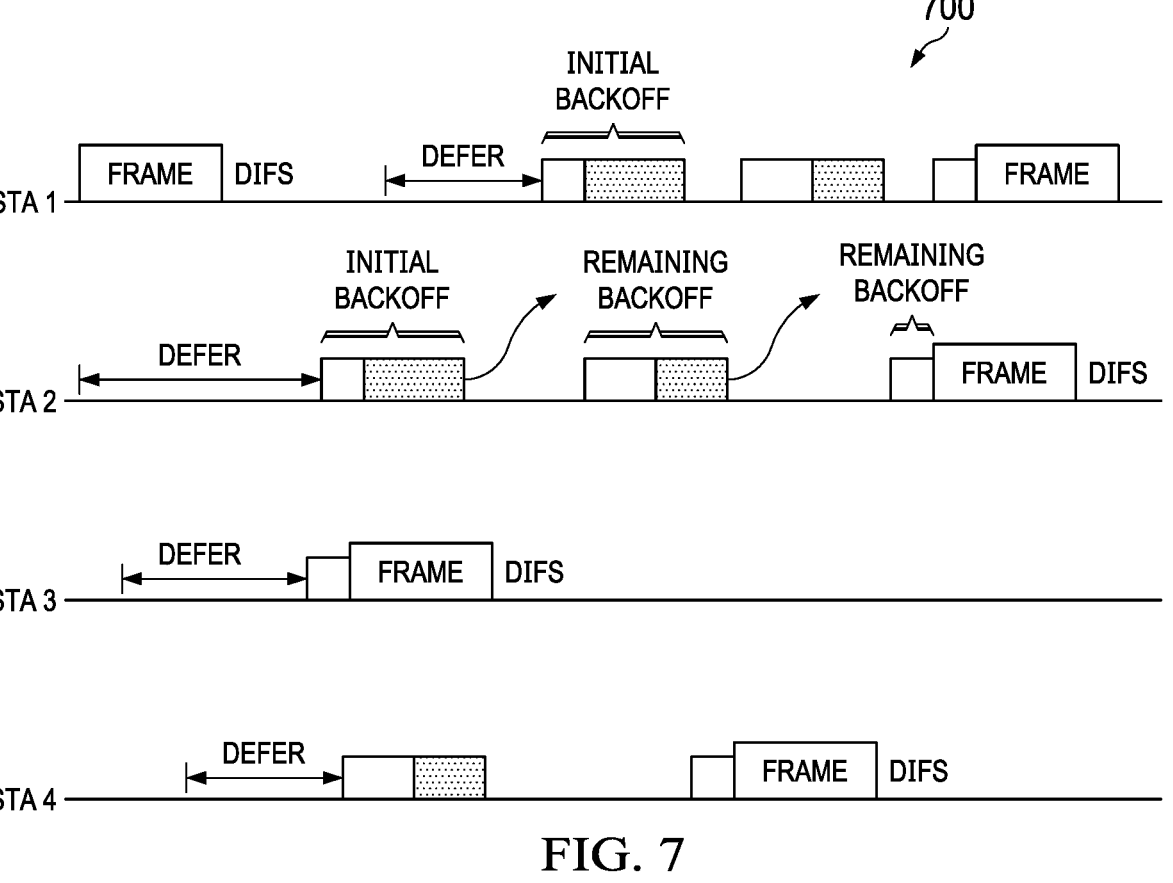
FIG. 7 is a diagram of an example conventional Wi-Fi channel access procedure.

Wi-Fi is an eminent example of applying the listen-before-talk mechanism. Wi-Fi uses 802.11 standards technologies such as the air interface (including physical (PHY) and MAC layer). In 802.11, a communication channel (or referred to as a wireless channel) is shared by stations under a mechanism called distributed channel access with a function called DCF (distributed coordination function), which uses CSMA/CA. The DCF uses both physical and virtual carrier sense functions to determine the state of the medium (i.e., the communication channel). The physical carrier sense resides in the PHY, and uses energy detection and preamble detection with frame length deferral to determine when the medium is busy. The virtual carrier sense resides in the MAC and uses reservation information carried in the Duration field of the MAC headers announcing impeding use of the wireless channel. The virtual carrier sense mechanism is called the network allocation vector (NAV). The wireless channel is determined to be idle only when both the physical and virtual carrier sense mechanisms indicate it to be so. A station (e.g., STA 1) with a data frame for transmission first performs a CCA by sensing the wireless channel for a fixed duration, i.e., the DCF inter-frame space (DIFS). If the wireless channel is busy, the station waits until the channel becomes idle, defers for a DIFS, and then waits for a further random backoff period (by setting a backoff timer with an integer number of slots). The backoff timer decreases by one for every idle slot and freezes when the channel is sensed busy. When the backoff timer reaches zero, the station starts data transmission. The Wi-Fi channel access procedure 700 as described above is shown in FIG. 7.

To meet the regulatory requirements of operating in the unlicensed spectrum and to co-exist with other radio access technologies (RATs) such as Wi-Fi, the transmissions on the unlicensed spectrum cannot be continuous or persistent in time. Rather, on/off, or opportunistic transmissions and measurements on demand may be adopted.

Figure 8A:
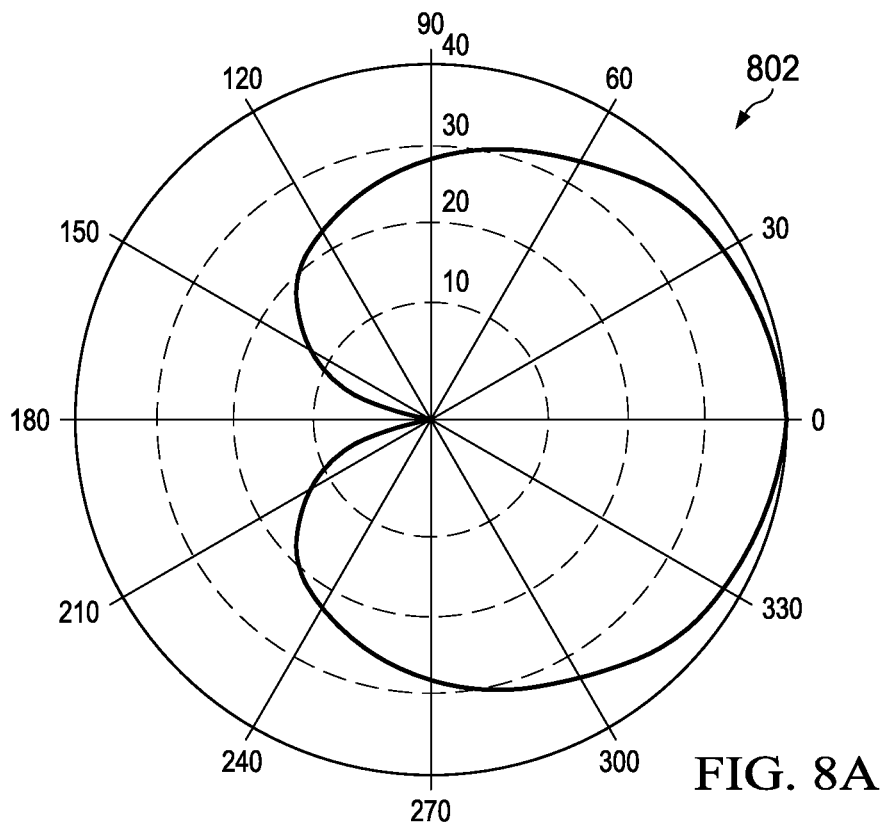
FIG. 8A is a diagram of an example wide beam pattern.
Figure 8B:
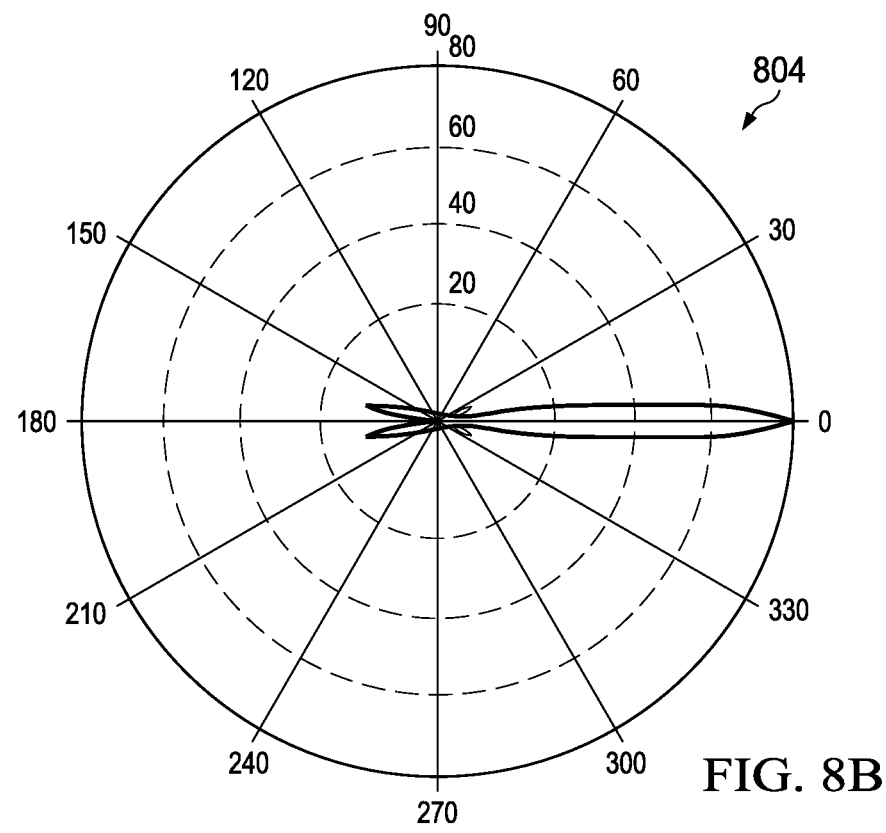
FIG. 8B is a diagram of an example narrow beam pattern.

In addition, for operations in high-frequency bands, especially in the bands at 28 GHz to 60 GHz, which generally belong to the mmWave regime, communications have quite different propagation characteristics from that at microwave frequency bands (generally below 6 GHz). For example, mmWave experiences higher pathloss over distance than microwave does. Therefore, high-frequency bands are more suitable for small cell operations than macro cell operations, and they generally rely on beamforming with a large number of antennas (e.g., >16, and sometimes maybe even a few hundred) for effective transmissions. Note that at high frequency, the wavelengths, antenna sizes, and antenna spacing may all be smaller than those at low frequency, thus making it feasible to equip a node with a large number of antennas. As a result, the beams formed by the large number of antennas can be very narrow, for example, with beamwidth of 10 deg or even less. In sharp contrast, in traditional wireless communications, beamwidth is generally much wider, such as in tens of degrees. FIG. 8A illustrates a diagram of a wider beam pattern 802 with a small number of antennas in low frequency. FIG. 8B illustrates a diagram of a narrow beam pattern 804 with a large number of antennas in high frequency. In general, it is regarded that narrow beams are a major new feature of mmWaves. As a general rule of thumb, the beamforming gain by massive MIMO can be roughly estimated by $N \times K$, where N is the number of transmit antennas and K is the number of receive antennas. This is because the 2-norm of the channel matrix H scales roughly according to $(N \times K)^{1/2}$, and therefore if the precoding vector by a transmitting node is p, and the combining vector by a receiving node is w, then the composite channel is w'Hp, and by properly selecting w and p, the composite channel gain in energy can attain $N \times K$, which is much higher than the case with fewer antennas.

NR standards do not specify an autonomous UE triggered COT (i.e., COT not scheduled by a gNB). NR standards specify a gNB initiated COT. During a gNB initiated COT, a UE may be allowed to transmit as a sharing COT device (i.e., the UE shares the gNB initiated COT for transmissions). The gNB may configure a UE transmission including indicating a LBT type that the UE needs to use as a COT sharing device during the gNB initiated COT. The type of UL channel access (e.g., LBT) may be indicated by the gNB in the UL grant scheduling.

The LTE LAA and NR-U specifications define two types of operations for unlicensed channel access based on the channel access timing synchronization, i.e., a load-based equipment (LBE) mode of operation, and a frame-based equipment (FBE) mode of operation.

Figures 9, 10:
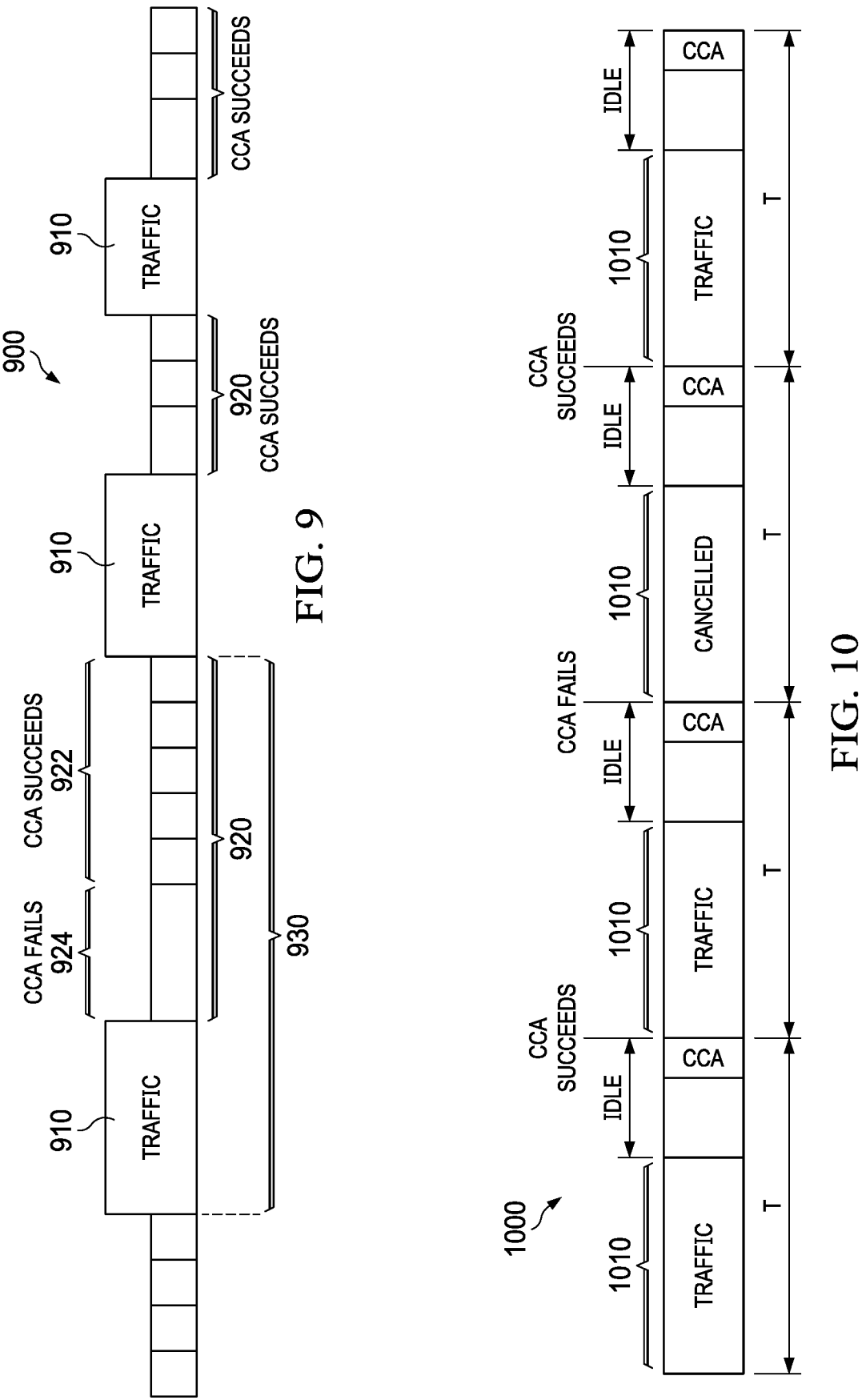
FIG. 9 is a diagram of an example timing of operations in a load based equipment (LBE) mode.
FIG. 10 is a diagram of an example timing of operations in a FBE mode.

In the LBE mode of operation, the unlicensed channel access is not synchronized with an external clock and a COT is initiated as soon as a CCA procedure is successful. FIG. 9 is a diagram of an example timing 900 of operations in a LBE mode. After each COT 910 in a fixed frame period (FFP) 930, a gNB executes a channel sensing (e.g., CCA) on sensing slots 920, and when the channel being sensed is perceived as idle, the gNB starts a random backoff counter. The random backoff counter is decremented for each sensing slot 922 when the channel is found idle. If during the sensing, the channel is busy (e.g., in sensing slot 924), i.e., the CCA fails, then the backoff counter decrementing is stopped.

FIG. 10 is a diagram of a timing 1000 of operation 1000 in a FBE mode according to TS 37.213. In the FBE mode of operation, a gNB executes a LBT operation (e.g., an extended CCA) every time interval T (period) on a channel, e.g., during an idle period. If the channel is found idle according to the LBT operation, the gNB may initiate a COT 1010 of a duration Ty, which is a fraction of the repetition period (T). That is, the gNB is the one who first starts using the COT for transmission. The COT 1010 is initiated periodically every fixed frame period (FFP) T in two consecutive radio frames, starting from an even indexed radio frame at $x \cdot T$, with a maximum channel occupancy time $Ty = 0.95*T$, where T is the FFP in ms, which is also known as a frame and is a higher layer parameter, and x is an integer representing the period number (i.e., FFP number). This type of access is referred to as the semi-static channel occupancy in TS 37.213. Only a gNB can initiate a COT in the FBE mode. As shown in FIG. 10, each FFP includes a COT 1010 starting at the beginning of the FFP and followed by an idle period. The gNB performs CCA before the next FFP starts, e.g., in the idle period of the current FFP. If the channel is found available (not occupied, or clear) based on the CCA, the gNB may initiate a COT 1010 in the next FFP.

In the FBE mode of operation, a UE is provided information about the FFP by the gNB, such as starting positions of the FFP and time duration of the FFP. UE transmissions within the FFP can occur if one or more DL signals/channels, (e.g., a physical downlink control channel (PDCCH), a synchronization signal block (SSB), a physical broadcast channel (PBCH), remaining minimum system information (RMSI), or a configured grant (CG)-PDCCH) within the FFP are detected.

TS 37.213 defines a periodic COT (with period of T=FFP) that is triggered (initiated) by a gNB (as discussed above), and such periodic COT may be referred to herein as a first type of periodic COT. A COT may be referred to as a duration during which a channel is "owned" by an initiator who initiates the COT. During the COT, the initiator may have multiple transmissions, and possibly allows other devices, such a receiver, to share the COT in the sense that the receiver can do some transmissions also. An initiator initiating a COT may be understood as the initiator first starting a transmission at the beginning of an FFP associated with the COT after verifying that the channel is clear, and other devices that share the COT can transmit only after the initiator has initiated the COT and provided grants for COT sharing. In the NR specification Rel16 or older, a UE cannot be an initiator and only a gNB can initiate a COT. That is, the UE can use a COT only after the COT is initiated by the gNB (after the gNB starts a transmission in the COT) and the gNB grants the UE a permission to share the COT. For example, a gNB may initiate a COT, perform a DL transmission, and schedule a UE to share the COT. The UE detects the DL transmission, and thereafter, may perform a UL transmission according to the scheduling in the COT. During the COT, the LBT procedure performed may be different than the LBT procedure performed outside of the COT, and more specifically, the LBT during the COT may be very short and a deterministic period may be used to execute a CCA, or if the gap between consecutive transmissions is shorter than a preset period, e.g., 16 us, no CCA (LBT) is necessary.

Before initiating a COT in the FBE mode, a gNB, according to TS 37.213, has to execute an extended CCA procedure named LBT Category 4 in 3GPP, which is referred to as a basic LBT. This basic LBT procedure includes a truncated exponential backoff based on energy detection (ED). During this procedure, the gNB senses a channel, and if the channel is detected as idle (i.e., low energy is detected on the channel), the gNB starts a random backoff counter that is decremented each time the channel is detected idle in a sensing slot. When the random backoff counter reaches zero, the gNB may proceed and initiate the COT; otherwise, if the random backoff counter does not reach zero before the COT expires, the gNB has to skip the current transmission opportunity (i.e., the current FFP), and wait for the next period to initiate the COT for transmissions. The terms of "transmission opportunity" "opportunity" are used interchangeably throughout the present disclosure.

The restriction that only gNB could initiate an FBE COT, as mentioned above, can lead to unnecessary delays for UL transmissions or overhead. For instance, if a UE is a security camera where UL transmissions are triggered by movement detection, the UE traffic in UL can be delayed one FFP in the best case. In this case, a gNB may schedule, if the channel is idle, a periodic COT and schedule UL grants to the UE even if the UE has no data transmission. This leads to UE battery power and RF spectrum waste as the UE needs to monitor each periodic COT.

Such issue discussed above may be avoided if the UE can initiate FBE COTs. Using the above example, if a UE camera can initiate FBE COTs, the UE camera may trigger a periodic COT as soon as a movement is detected, and cancel the periodic COT when a video transmission ends or stops.

Embodiments of the present disclosure provide a method for a UE initiated FBE COT that will reduce the delays and overhead. When the UE has data to transmit, the UE does not need to wait until after a gNB initiates a COT of an FFP and schedules/grants the UE to share the gNB initiated COT, and the UE then transmits in the shared gNB initiated COT. Instead, the UE itself may initiate a COT of an FFP for transmission in the UE initiated COT. In other words, the UE may detect whether a channel is clear before the FFP, and if the channel is clear, the UE may start transmitting at the beginning of the FFP to initiate the COT of the FFP. The UE is the one who first start transmitting in the FFP. The proposed embodiments define additional types of periodic COTs (semi-static channel access) initiated by a UE. In the embodiments, a UE may be able to initiate a COT periodically associated with FBE mode of operations. For a COT that is initiated by a UE, the UE may be referred to as an initiator and owner of the COT, and only this COT initiating UE can grant transmissions during the UE COT. The UE may share the COT with other devices, such as a gNB or another UE. A periodic COT is a COT that can be initiated periodically, for example, every FFP within a configured time interval. In the embodiments of the present disclosure, a UE may initiate a single COT or a periodic COT.

In some embodiments, a second type of periodic COT that is initiated by a UE is provided. In this type of COT, a gNB may provide a UE with a time interval $T\_UE\_COT$ via start positions and possible end positions when the UE can initiate periodic COTs. The time interval $T\_UE\_COT$ indicates an interval during which a UE is allowed to initiate a COT or a periodic COT. The time interval $T\_UE\_COT$ may be indicated using a start position of the time interval and an end position of the time interval, or other manners. For instance, the start position and the end position of the time interval may be expressed or indicated in terms of a frame index, or number of frames via signaling. The gNB may also provide a configuration of an FFP (also referred to as an FFP configuration) to the UE initiating a COT. The FFP may also be referred to as a "period" throughout the disclosure. The FFP configuration may include an FFP value, e.g., indicating a length (time duration) of the FFP. If the FFP value is not provided, the UE may consider the last FFP value used by the serving cell/gNB, for instance. At the beginning of each FFP, there is an opportunity for a UE to initiate COT. This opportunity is herein referred to as a COT opportunity, or periodic COT opportunity for periodic COT. If the UE does not take this opportunity to initiate a COT, the UE lost the COT opportunity, and needs to wait for the next COT opportunity to initiate a COT. As will be discussed below, the UE may perform an uplink transmission in a COT opportunity for a current FFP, i.e., at the beginning of the current FFP, which initiates a COT for the current FFP. The UE may then own a COT of the current FFP, and perform transmissions during this UE initiated COT of the current FFP. If the UE does not initiate the COT of the current FFP, the UE may initiate a COT for the next FFP or another FFP in future using the same mechanism.

The embodiments are different from buffer status report (BSR) where a UE sends scheduling request (SR) and a gNB allocates resources for UL transmission. For BSR, transmission opportunities need to be scheduled in a COT, which shall be initiated by the gNB, and the UE never has the "ownership" of the COT. In the embodiments, a gNB is not required to initiate a COT. A UE may initiate and own a COT that can be shared with the gNB, for instance.

Embodiments of the present disclosure also provide a solution that allows multiple UEs to compete and initiate a COT during a FBE operation. A gNB may acknowledge a "winner" of a contention UE as the owner of the COT.

Figures 11, 12:
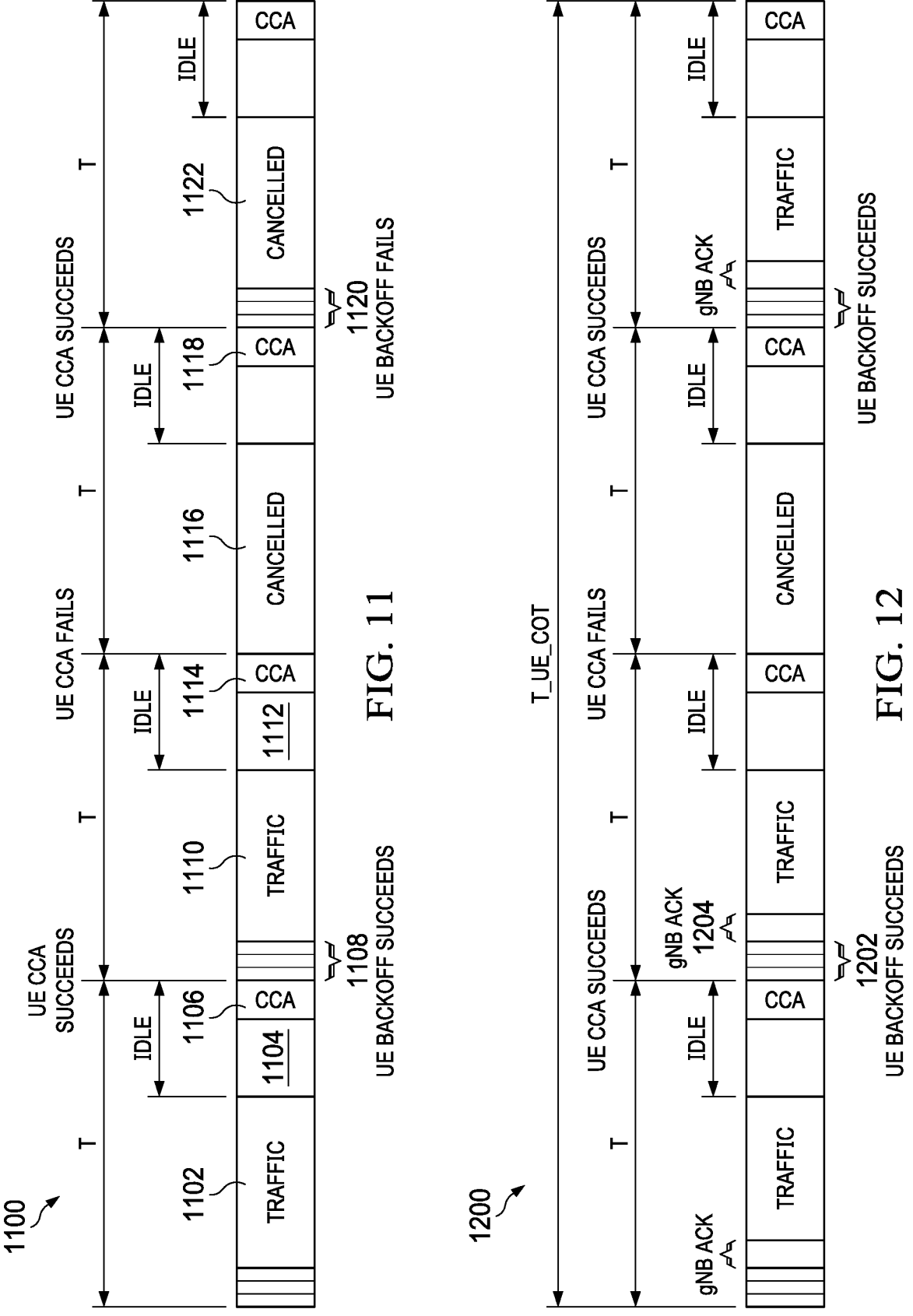
FIG. 11 is a diagram of an embodiment timing of UE operations, highlighting a backoff-after-CCA procedure.
FIG. 12 is a diagram of an embodiment timing of UE operations, highlighting a time interval T_UE_COT allocated for a group of UEs and confirmation of UE initiated COTs.

In some embodiments, a gNB can allocate the time interval T_UE_COT (as shown in FIG. 12) for UE initiated COTs to either a single UE or a group of UEs. If the time interval T_UE_COT for the UE initiated COTs is allocated to a single UE, the UE can initiate a periodic COT immediately after a successful extended CCA (e.g., LBT Category 4) procedure during this time interval T_UE_COT. The period (FFP) of the periodic COT may be provided by the gNB. The LBT type of the LBT to be performed by the UE may be provided by the gNB, or, for instance, the UE may use the Type 1 of LBT by default or use a short time deterministic LBT for channel sensing. In a different embodiment, the LBT type and the period (FFP) may be obtained by the UE from higher layer configurations.

The period (FFP) for a UE to initiate a COT may be configured or pre-configured. The period (FFP) for a UE to initiate a COT may be provided by the gNB. Possible values of the FFP may be the same as or different than an FFP (period) of a gNB (initiated) COT. In some embodiments, a FFP value may be provided for a single shot COT, which may correspond to an equivalent infinite period duration. LBT may still be required or performed during the infinite period duration for transmissions. In another embodiment, an FFP configuration may signal that only a short COT for short control signal transmissions can be initiated. A short COT would not require LBT as per Short Control Signal transmissions specified in ETSI specifications (e.g., ETSI EN 301 893 V2.1.1 (2017-05)). In some embodiments, the period for the UE initiated COT may be the same as DL FFP for gNB, or always the same as that for a single shot COT, or may be a fixed value, either as desired operation or before the RRC is provided. The configured or otherwise known period for the UE initiated COT may be overridden by the UE informing a "skip", or by the UE informing a "new period", where the "new period" value is for one or more initiated COTs or some small or limited number of allowed or configured values. Transmissions during the COT may be viewed as a buffer status report from the UE but at a more physical level.

The FFP values can be different (for example, single shot or infinite period) by default for certain traffic types (e.g., infrequent alarm). The FFP configuration can also indicate the UE to operate in a gNB initiated COT mode, where the UE must use a gNB FFP configuration. That is, the UE may transmit using a gNB initiated COT according to the corresponding gNB FFP configuration. In some embodiments, the UE may be instructed to switch between transmitting using a UE initiated COT and transmitting using a gNB initiated COT.

In some embodiments, the time interval T_UE_COT may be divided in periods (FFPs), and the periods may be determined (configured) by a gNB or a higher layer configuration. For example, the time interval T_UE_COT may include a number of FFPs, and number of FFPs may be determined by a network. At the beginning of each period, a UE may opt in or opt out of triggering a COT or periodic COT for the FFP. To opt in (i.e., determining to trigger or initiate a UE COT or a UE periodic COT during the FFP), a UE will proceed first to LBT, and if the LBT is successful, the UE will proceed to its transmissions in the COT of the FFP. To opt out, a UE can skip the LBT and have a very short UL transmission to inform that it will skip the opportunity for starting a COT or a periodic COT. The short UL transmission may be an UL skip message, which can be just a simple sequence predefined in order to be more robust.

If the UE skip one opportunity in the time interval T_UE_COT, it may take the next one to initiate a COT in the time interval T_UE_COT, unless the UE is disallowed to do so by a gNB, e.g., through a specific message. In that case, the gNB can take over for the rest of T_UE_COT.

A COT may be a UE initiated COT as soon as the UE has an UL transmission (e.g., PUCCH, PUSCH, SR, or SRS) after LBT procedure was successful prior to a FFP beginning. That is, the UE may initiate the COT when it performs the UL transmission in an FFP associated with the COT. The UL transmission may start at the beginning of the FFP (or at the beginning of a COT opportunity in the FFP), and end before an idle period of the FFP. The UL transmission of the UE who transmits in uplink for initiating a COT may be referred to as a first transmission of the UE in the COT (opportunity). Other transmissions in the COT will be after the first transmission and end before the idle period of the FFP. A gNB detecting the first transmission may determine that the UE initiates the COT of the FFP. The frequency resources for this UL transmission may be provided in advance by a gNB, or the gNB can detect a cyclic shift as in RACH detection. The UL transmission may include, for example, a PUCCH, a PUSCH, a scheduling request (SR), a sounding reference signal (SRS), or channel state information (CSI) (such as a channel quality indicator (CQI)). The UL transmission may be transmitted in some predetermined resources. In one embodiment, the UE may initiate the COT using an entire channel or a subset of carriers. If a subset of carriers is used, the gNB may need to perform scheduling for UEs such that a minimum channel bandwidth occupancy requirement be satisfied.

In an embodiment, a UE may inform a gNB whether it intends to use a next FFP or skip the next FFP. For instance, the UE may be allowed to initiate a number of COTs in a T_UE_COT time interval. The UE may inform the gNB that it will skip a certain number or all of COT opportunities in the T_UE_COT, or initiate some or all COTs in the T_UE_COT interval. This information enables the gNB to reuse the unused UE initiated COT opportunities, which may be allocated to another UE or for a different type of traffic.

In some embodiments, a gNB may allocate the time interval T_UE_COT to a group of UEs. In this case, the T_UE_COT is a time interval during which the group of UEs is allowed to initiate a COT. In this case, the group of UE competes for initiating a COT in an FFP. In order to avoid collisions between multiple UEs that have passed successful LBT Category 4 (extended CCA) prior to a periodic COT opportunity, an additional backoff procedure follows immediately after the initial LBT as a part of a COT start (initiation) procedure. That is, each UE performs the COT initiation procedure in the T_UE_COT in a periodic COT opportunity. During the COT initiation procedure, each UE performs a CCA to detect whether a channel is idle. If the channel is idle, the UE may perform immediately the additional backoff procedure. In this additional backoff procedure (also referred to as a backoff-after-CCA procedure), each of the UEs that successfully passed the LBT generates a random backoff counter R and continues to sense the channel. The backoff counter is decremented at each sensing slot when the channel is sensed as idle. A UE can initiate the COT when R=0. The initial value of the backoff counter R of each UE can be provided by the gNB, configured by higher layers or be a predefined default number. In one example, the backoff initial value of the backoff counter R for each UE may be proportional to the number of UEs in the group in order to reduce collisions chances.

Note that in Internet of things (IoT) applications, UL traffic may be uneven and triggered by field events or measurements. In this case, it is expected that an additional backoff period at the start of a COT opportunity (beginning of an FFP), which can last several symbols, will not affect the throughput during the COT, which can be milliseconds.

In one embodiment, the gNB may provide, for each UE, a random counter initial range (e.g., a contention window (CW)) with the possibility to give more priority to some UEs (shorter CW). For example, each of the group of UE may be configured with a CW. One or more UEs may have more or higher priority (e.g., with shorter CWs) than the other UEs (having longer CWs). In a different embodiment, each UE may use a backoff counter initial range based on its traffic priority. For example, each UE may be configured with a backoff counter initial range based on its traffic priority.

FIG. 11 is a diagram of an embodiment timing 1100 of UE operations, highlighting a backoff-after-CCA procedure. In this example, a group of UEs are configured to initiate periodic COTs for each COT opportunity using the backoff-after-CCA procedure. A UE of the group may perform transmissions in a COT 1102 initiated by the UE for a first COT opportunity. After the COT 1102 expires, the UE may enter into an idle period 1104, and then perform CCA (in a time region 1106) before the next (second) COT opportunity starts. When the CCA succeeds, the UE may start an additional backoff procedure and continue to sense the channel. A random backoff counter is started with an initial value. If the channel is sensed idle during the additional backoff procedure, that is, the random backoff counter is decreased to zero (in a time region 1108), the UE may initiate a COT 1110 for the second COT opportunity, e.g., by transmitting a UL transmission in the second COT opportunity, and continue to perform transmissions in the initiated COT 1110. The UE stop its transmissions when enters an idle period 1112 after the end of the COT 1110, and performs CCA in a time region 1114 to determine whether it can initiate a COT 1116 for the next (third) COT opportunity. If the CCA fails, the UE may cancel the third COT opportunity. That is, the UE skips the third COT opportunity for transmissions. The UE may perform CCA prior to the next (fourth) COT opportunity (in a time region 1118) and the CCA may succeed. In this case, the UE may start an additional backoff procedure and continue to sense the channel in the time region 1120. If the channel is sensed busy in a sensing slot during the additional backoff procedure, the additional backoff procedure fails. In this case, the UE will not be able to initiate a COT 1122 in the fourth COT opportunity, and thus cancels the fourth COT opportunity. The above may be performed by each of the UEs in the group.

In some embodiments, after a successful UL transmission from a UE that initiates a COT, that COT started or initiated may be confirmed (ACK) by a gNB via a DL transmission, for instance, a PDCCH that schedules an UL grant for the UE, or a hybrid automatic repeat request acknowledgment (HARQ_ACK) to the first UL transmission. For example, a UE may transmit an UL transmission to a gNB to initiate a COT in a FFP. The gNB may successfully receive the UL transmission, and transmit a DL transmission to the UE to acknowledge or confirm initiation of the COT by the UE.

Note that if multiple UEs are allowed to compete to initiate a COT, each UE may have different time advance (TA) for UL transmissions, while still being synchronized to the gNB via a primary synchronization signal/secondary synchronization signal (PSS/SSS) of the gNB.

In another embodiment, each UE's first transmission (i.e., the UL transmission used to initiate or start a COT) may be scrambled with a UE specific code, such that if two or more UEs transmit UL transmissions at the same time, the UL transmissions may be decoded by the gNB. In one embodiment, only one UE COT may be retained and confirmed by a gNB ACK. That is, the gNB may select one of the UEs transmitting the UL transmissions as owner of the COT, and confirm or acknowledge initiation of the COT by the selected UE. The confirmation can be a unicast to a single UE, or multicast where the UE COT owner is identified, for instance, via a sequence. In the case of unicast, downlink control information (DCI) scrambled with radio network temporary identifier (RNTI) may be used. In case of multicast, a DCI or group common DCI scrambled with a group RNTI may be used, and the contents of the DCI include the identification of the UE COT owner, for instance via a sequence encoded in a DCI field.

In some embodiments, multiple UEs may share one COT initiated by the UEs. A gNB may confirm the shared COT to multiple UEs and provide, in the feedback to each UE, resource allocations for their transmissions.

FIG. 12 is a diagram of an embodiment timing 1200 of UE operations, highlighting a time interval T_UE_COT allocated for a group of UEs and confirmation of UE initiated COTs. In this example, the group of UEs is configured to be able to initiate periodic COTs for each COT opportunity during the time interval T_UE_COT. The UE may perform an additional backoff procedure (in a time region 1202) after a successful CCA and starting with the beginning of a COT opportunity (beginning of a FFP). If the channel is sensed idle during the additional backoff procedure, the UE may initiate a COT for the COT opportunity, for example, by transmitting an UL transmission to a gNB in the COT opportunity (beginning of a FFP). However, different than the example of FIG. 11, the UE will wait for a response from the gNB after transmitting the UL transmission to the gNB, where the response from the gNB may confirm (acknowledge) or reject the UE's initiation of the COT. In this example, the UE receives an acknowledgment (ACK) from the gNB acknowledging the initiation of the COT by the UE (in the time region 1204). The UE thus becomes the owner of the COT and performs UL transmissions in the COT.

Figures 13, 14:
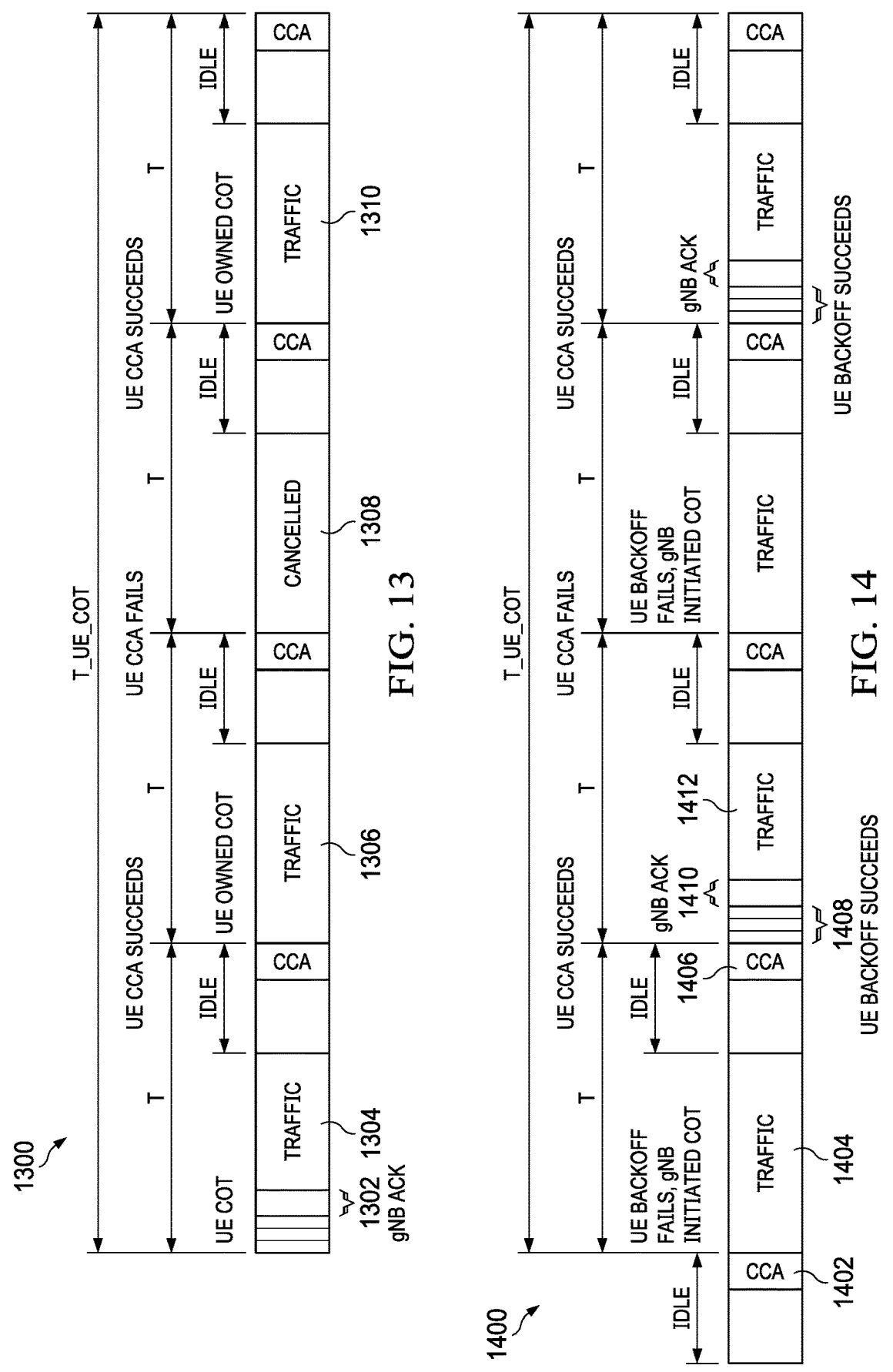
FIG. 13 is a diagram of an embodiment timing of UE operations, highlighting gNB allocated periodic COTs.
FIG. 14 is a diagram of an embodiment timing of gNB and UE operations, highlighting initiation of COTs by both a gNB and a UE.

In another embodiment, when the gNB acknowledges a periodic UE initiated COT, the gNB can allocate several periodic COTs to a specific UE. In this case, the UE may not be required to start a backoff period after the LBT is successful, and it may start the UL traffic in pre-allocated resources immediately after the COT starts. FIG. 13 illustrates an example of this case. FIG. 13 is a diagram illustrating an embodiment timing 1300 of UE operations, highlighting gNB allocated periodic COTs. The UE starts an additional backoff procedure as discussed above, and initiates a COT 1304 upon success of the additional backoff procedure. The gNB acknowledges initiation of the COT 1304 by the UE, and also allocates periodic COTs 1306, 1308 and 1310 to the UE (in a time region 1302). The UE receives the ACK from the gNB, and performs UL transmissions in the COT 1304. After the ownership period of the COT 1304 expires, the UE can initiate periodic COTs 1306, 1308 and 1310, as instructed by gNB. For the COTs 1306, 1308 and 1310, the UE may only need to perform a CCA before each of the COTs. If the CCA before a COT succeeds, the UE perform transmissions in the COT without need to do the additional backoff procedure.

In some embodiments, a third type of periodic COT is provided. In the third type of periodic COT, both UEs and gNB can initiate COTs. In one embodiment, prior to a COT, an idle and CCA period may be mandated as specified by the regulations and presented above. A gNB may have a higher priority to initiate a COT, and it may initiate the COT immediately after the CCA period if a channel is found idle. UEs may have a lower priority to initiate a COT, and therefore may continue with a backoff procedure, during which a random counter is decremented for each sensing slot when a channel is idle. In order to make sure that there are no collisions between gNB transmissions and UE transmissions, a UE contention window (CW), may be configured and may have a minimum value greater than zero. The third type of periodic COTs may be initiated during a time period (e.g., T_UE_COT), and may be configured in advance by the gNB such that UEs or a subset of UEs that can initiate a periodic COT know the time period in advance.

FIG. 14 is a diagram illustrating an embodiment timing of gNB and UE operations 1400, highlight initiation of COTs by both a gNB and a UE. FIG. 14 illustrates an embodiment for initiating the third type of COTs, where the gNB has a higher priority than the UE for initiating a COT. In this example, both the UE and the gNB compete for initiating a COT periodically in the time interval T_UE_COT. Both the UE and the gNB may perform a CCA (in a time region 1402) before a COT 1404. When the UE's CCA succeeds, the UE may perform a backoff procedure, similarly to the additional backoff procedure discussed above. If the backoff procedure of the UE fails, i.e., the channel is sensed busy in a sensing slot and the random counter has not reached zero, the gNB may initiate the COT 1404 (e.g., by transmitting a DL transmission), and become the owner of the COT 1404. In this case, the COT 1404 is a gNB initiated COT. Prior to the next COT 1412, both the UE and the gNB perform a CCA (in a time region 1406). The UE may have a successful CCA and backoff procedure (1408), and then transmit an UL transmission to the gNB to initiate the COT 1412. Once the UE receives an ACK from the gNB acknowledging the initiation of the COT 1412 by the UE (1410), the UE becomes the owner of the COT 1412, and the COT 1412 is a UE initiated COT. If the gNB rejects the initiate the COT 1412 by the UE, the gNB may own the COT 1412.

In an embodiment, the gNB may allow the UE to have a zero backoff duration before starting a COT. The gNB may acknowledge the UE transmission and the COT, for instance, using a HARQ-ACK message to the UE, or may cancel UE the COT transmission via a HARQ-NACK message, and take over the COT ownership.

In some embodiments, in all UE initiated COTs, a gNB can take over any periodic COT, cancel any periodic COT, or change any periodic COT from UE initiated to become a gNB initiated COT. The gNB may also change the period and duration of a COT, e.g., through control signaling to UEs. In order to achieve this, the gNB can request a COT interruption or cancellation or change in various ways, for instance, by adding a field to a HARQ ACK-NACK message, or adding a field in DCI. The gNB requesting a COT interruption or cancellation or change may also be done in a slower manner by MAC CE or RRC message.

In some embodiments, a gNB can specify, to UEs, a subset (e.g., a pattern) of time intervals or a pattern of opportunities that are available for the UEs to initiate or trigger a COT. For instance, a UE may only be allowed to initiate a COT in odd/even periods (FFP), UL/DL transmission periods, or in UL transmission periods. The time opportunities to initiate a COT or a periodic COT may be provided by a base station, configured by higher layers or predefined. The opportunities may be allocated to UEs based on a UE category or a UE capability, for instance. By allocating patterns of opportunity in T_UE_COT, the gNB may allow multiple UEs to share (i.e., to initiate/trigger COTs) in the same T_UE_COT duration.

In some embodiments, configuration of a COT or a periodic COT, which may also be referred to as a FFP configuration in the present disclosure, for UEs may be performed and signaled to the UEs by a gNB, or may be pre-configured to the UE and reconfigurable. An FFP configuration for a UE initiated COT may be different from or the same as an FFP configuration for a gNB initiated COT. As an example, a gNB communicates with a set of UEs that are configured by the gNB for COT initiation. A UE may first perform channel sensing based on CCA, and after the CCA succeeds, the UE may transmit in uplink (an UL transmission) to the gNB to initiate a COT based on configurations of uplink transmissions and of COT from the gNB. The gNB, after detecting the corresponding uplink transmission from the UE, may determine that the COT is a UE initiated COT, and determine its follow-up/subsequent actions to be taken based on the detected UE initiated COT and its own status. The actions to be taken by the gNB may include confirming the COT initiated by the UE, or indicating to the UE to share in a gNB initiated COT, or indicating to the UE to share in a COT initiated by a different UE. The corresponding indication from the gNB may be sent in downlink control information (DCI) in a PDCCH. The indication may include information of the COT (also referred to as COT information, COT parameters, or COT for FFP parameters), such as periodicity of a FFP (which is also a period/periodicity of a COT opportunity), MCOT in the FFP, a time offset of the FFP, a min idle duration in the FFP, a max idle duration in the FFP, a channel, a bandwidth, or a combination thereof. The FFP is the length (or time duration, or period) of the fixed frame period, the MCOT is the maximum allowed COT duration in the period (FFP), the min idle duration and max idle duration is the respective minimum and maximum time duration for idle period (no transmission) in the FFP, and the channel and the bandwidth represent frequency resources used for transmissions in the COT. A configuration of a COT or a periodic COT, which can be initiated by a UE or a gNB, may include the COT parameters as described above. A UE may receive the configuration of a COT from a gNB.

In some embodiments, after a successful CCA, a UE may transmit in the uplink a channel or a signal (referred to as an uplink transmission) to initiate a COT. The uplink transmission by the UE may be a PUSCH based on a configured grant (CG). Alternatively, the uplink transmission may be a PUCCH based on a radio resource control (RRC) configuration of a gNB and CSI (channel state information) such as CQI, a rank indicator (RI), a precoding matrix indicator (PMI), etc. In an example, the uplink transmission is a PUCCH (HARQ) or a SR (scheduling request) sent in the PUCCH, or both. In another example, the uplink transmission may be a physical random access channel (PRACH) preamble sent by the UE. The PRACH opportunity (in terms of time and frequency resource) and the preamble sequence of the PRACH preamble may be configured by the gNB. Yet in another example, the uplink transmission may be a SRS (sounding reference signal) transmitted to the gNB in a SRS resource (in terms of time and frequency resource, comb position, sequence, etc.) configured by the gNB.

In some embodiments, after a successful CCA, a UE may send in uplink to a gNB a COT permission request requesting to initiate a COT by the UE. The COT permission request may be sent in a PUCCH resource or a PDSCH resource based on a CG. The COT permission request may include information of one or more of the following: a SR (scheduling request), a BSR (buffer status report) at the UE, or CSI.

The gNB performs detection of possible uplink transmission(s) from the UE(s) that initiates a COT or requests to initiate a COT on the channel(s) and signal(s) configured to the UE(s) for COT initiation. When the gNB transmits, for example in a COT initiated by the gNB, it may not be able to perform detection at the uplink. Furthermore, the gNB may fail to detect the uplink transmission(s) due to interferences, low signal levels, etc. Therefore, an uplink transmission from a UE to initiate or request a COT can be missed by the gNB. In addition, multiple UEs may transmit in the uplink to initiate or request a COT at roughly the same time. Therefore, several situations may occur. In one case, a UE is the only one to initiate or request a COT at a point of time and hence there is no collision/overlapping. In another case, a UE and a gNB both initiate a COT, and the gNB missed the UE uplink transmission and hence is not aware of the UE's initiation or request for the COT. In yet another case, the gNB also initiates a COT (after a CCA success), and the gNB detected the UE uplink transmission and hence is aware of the UE's initiation or request for a COT. In yet another case, another UE (or more UEs) may also initiate or requests a COT and the gNB detects multiple UEs' COT initiation or requests.

After a UE sends an uplink transmission that initiates or request permission to initiate a COT, it may wait for a response from the gNB. One reason for the UE to wait for the gNB's response is to solve the collision and overlapping between COTs initiated by the gNB and the UE or between COTs initiated by multiple UEs. The UE may not be aware of such collision or overlapping and may take some time to realize that. Therefore, the gNB may act as an arbiter to solve the collision, and send a response to the UE(s) to indicate information of the COT for the UE to use. As one example, the response from the gNB may include information indicating that the gNB confirms (or validates, or acknowledges) the UE initiated or requested COT. As another example, the gNB may invalidate or reject the UE initiated COT. As yet another example, the gNB may inform the UE to use or share a COT initiated by the gNB. As yet another example, the gNB may inform the UE to use or share a COT initiated or request by another UE. As yet another example, the gNB may determine and initiate a COT and send related information to the UE for the UE to share the COT. In the response, the gNB may confirm (acknowledge) or reject the UE initiated COT or the UE permission request to initiate a COT, or indicate a COT type that the UE may use, where the indicated COT may be initiated by the UE, by another UE or by the gNB.

The gNB's response or indication of the COT type for UE to use may be sent implicitly. That is, the gNB may indicate its response to the UE implicitly. For example, after the UE sends the uplink transmission to initiate or request for the COT, the UE may perform detection of a downlink transmission from the gNB. If any downlink transmission for the UE from the gNB is detected within a certain time window, the UE may consider that the COT it requested or initiated is granted, and may continue its uplink transmission, e.g., using the COT based on parameters configured for the UE initiated COT, such as a period (or FFP associated with the COT), a COT duration, idle time, and an offset of the FFP with respect to a frame number. Although this implicit acknowledge by the gNB may work in a relatively simple situation without considering collision of COT(s), there could be ambiguity, for example, when the gNB uses a different COT to transmit a downlink transmission to the UE.

In some embodiments, the gNB's response or indication of the COT to use can be sent explicitly. For example, after the UE sends the uplink transmission to initiate or request for the COT, the UE may perform detection of downlink control information (DCI). The gNB may send the COT information in the DCI. The COT information may include a COT configuration index identifying a COT configuration. A number of COT configurations (with each COT configuration including a period (e.g., FFP) associated with the COT, a COT duration, idle time of the period, and/or an offset of the period with respect to a frame number) may be configured to the UE, for example, via RRC, and each COT configuration may be given an index value. Each COT configuration defines a COT and corresponds to the COT. By sending an index of a COT configuration to the UE, the UE is informed of the corresponding COT to use. In an example, the COT information sent in the DCI may include a set of parameters (e.g., COT parameters) necessary for the UE to properly use or share the COT, and the set of parameters include a period associated with the COT, a COT duration, idle time of the period, and an offset of the period with respect to a frame number. The DCI for sending the COT information to the UE may be UE-specific. Alternatively, a group common DCI may be used to send the COT information to a group of UEs. The COT information may also be sent in a medium access control control element (MAC CE). After the UE detects the gNB's response and obtains the information of the COT to use or share, the UE transmits in uplink within the COT according to the COT information or parameters indicated to the UE.

In an embodiment, the gNB may indicate to the UE that no COT is to be used. As an example, after transmitting in the uplink to the gNB to initiate or request a COT, when a UE does not detect, within a time window, any validation/ACK message from the gNB to indicate the COT to use, the UE may consider that the COT initiation failed or the COT requested is rejected. In this case, the UE may perform detection of downlink transmissions in order to share a gNB indicated COT, or the UE may perform a CCA to initiate or request a COT again.

In an embodiment, after transmitting in the uplink to the gNB to initiate or request a COT, when a UE does not detect, within a time window, any validation/ACK message from the gNB to indicate a COT to use, and there is no other downlink transmission detected, the UE may consider that the COT initiation or request is granted. The UE may then perform transmissions in the COT initiated or requested.

FIG. 15 is a flowchart of embodiment operations 1500 of a UE for requesting a new UE COT for FFP. The UE sends, to the gNB, a UL request requesting for a new UE initiated COT for a FFP (step 1502). The requested new UE COT may have different parameters than a COT that has been used by the UE. The UE then starts a timer to wait for the response from the gNB in response to sending the UL request (step 1504). If the UE detects no reply from the gNB (step 1506) and the timer does not expire (step 1508), the UE goes back to step 1506 to continue to monitor the response from the gNB. If the timer expires and the UE does not receive the response from the gNB (step 1508), the UE does not change the COT for the FFP that is used by the UE (step 1510). If the UE detects the response from the gNB (step 1506), the UE determines whether the response indicates that the request is accepted by the gNB (step 1512). If the request is not accepted by the gNB, the UE proceeds to step 1510. If the request is accepted by the gNB, the UE may perform transmission in the new UE COT. The response may indicate parameters of the requested new COT, such as a position of the FFP, a duration of the COT in the FFP, idle period in the FFP, and so on, as discussed above. The UE may wait for the offset duration of the FFP as indicated by the response, perform a CCA prior to the FFP, and initiate the COT after the CCA succeeds.

A UE may send an UL request requesting permission to initiate a COT for a FFP in various ways. In one embodiment, the UE may send the request while sharing a gNB initiated COT. That is, the request is sent using the gNB initiated COT. In another embodiment, the UE may send the UL request while sharing a COT initiated by a gNB. That is, the request is sent using the gNB initiated COT. In another embodiment, the UE may send the request while being in its own initiated COT that is shared with a gNB. That is, the request is sent using the UE initiated COT, which is shared with the gNB. In yet another embodiment, the UE may send the request while being in its own initiated COT for a FFP and the UE wants to change parameters to the ongoing FFP to different FFP. That is, the UE sends the request in the UE initiated COT within the ongoing FFP, and the UE requests a new FFP and/or a new COT within the new FFP. In this requests, the UE may provide the gNB parameters for the new COT of the new FFP including, but not limited to, a periodicity, a channel, or a channel bandwidth, a max idle duration, MCOT, and an offset for the beginning of the new FFP period. The gNB may accept the request and the parameters as requested in the request, or it may overwrite the requested parameters with a new set of parameters, for instance, the gNB may offer a different periodicity, or different frequency resources (channel) or a different offset for the beginning of the new FFP. The gNB may also deny the request. If the request is denied, the UE cannot start the new COT for the new FFP with the requested parameters. If the UE was already configured with a COT for a FFP, it may only be able to initiate COTs based on an existing configuration, or it may share a gNB initiated COT for a FFP, or it may only initiate or share a dynamic COT. If the request was accepted by the gNB, the UE may start initiating COTs after the offset duration. The gNB's acceptance or denial may be achieved in various ways, for instance, by adding a field to a HARQ ACK-NACK message, or adding a field in DCI. The acceptance or denial may also be done in a slower manner by a MAC CE or RRC message. In some embodiments, acceptance (or denial) may be assumed by the UE unless the gNB denies (accepts) the request.

Embodiments of the present disclosure may allow to alternate periods of dynamic COTs with semi-static COTs (with FFPs) at both gNB and UE sides. A gNB may configure such time periods where dynamic or semi-static channel access is allowed.

For channel access for semi-static channel occupancy, as defined in TS 37.213, a gNB provides UE(s) with higher layer parameters ChannelAccessMode-r16='semistatic' by SIM1, or a dedicated configuration higher layer parameter provided in SemiStaticChannelAccessConfig, which indicates channel access parameters such as a periodicity of a semi-static channel access mode. In the frame-based operation (FBE) mode in unlicensed/shared spectrum, a device may transmit every Fixed Frame Period (FFP) for the maximum occupancy time (MCOT). The MCOT may be up to 95% of the FFP. The FFP, MCOT durations and the idle period in each FFP are the parameters (or a configuration) that characterize a gNB or UE initiated COT for each FFP.

Similarly, the associated parameters necessary for a UE initiated COT for a FFP need to be provided to the UE by the gNB. The parameters, such as the periodicity of the FFP, the MCOT, the time offset (for instance with respect to even frame, or frame number zero) of UE FFPs (COT opportunities) may differ from those for gNB initiated COT for FFP. The higher layer parameters as defined in TS 37.213 for providing the channel access parameters may be extended to provide parameters related to UE initiated COTs. As an example, the higher layer parameters may be extended as shown in FIG. 16. FIG. 16 shows an example of a semi-static channel access configuration information element (IE) 1600 that may be used for embodiments of the disclosure. As shown, the semi-static channel access configuration IE 1600 includes parameters for a UE initiated COT, such as an offset, a period, MCOT, and so on. The set of values for the period, offset, and MCOT of the UE initiated COT may be the same as the set of values for the gNB initiated COT, and a value provided to the UE may be the same as or different than a value configured for the gNB initiated COT. The period of a COT or a COT opportunity may also be referred to as a periodicity of an FFP associated with the COT. The period of the gNB initiated COT may be from the following set of values in ms: {1, 2, 2.5, 4, 5, 10}. The offset of the gNB initiated COT may be from the following set of values in ms: {1, 2, 2.5, 4, 5, 10}. The MCOT of the gNB initiated COT may be from the following set of values in %: {80, 85, 90, 95}. The period of the UE initiated COT may be from the following set of values in ms: {1, 2, 2.5, 4, 5, 10}. The offset of the UE initiated COT may be from the following set of values in ms: {1, 2, 2.5, 4, 5, 10}. The MCOT of the UE initiated COT may be from the following set of values in %: {80, 85, 90, 95}. In one embodiment, the value provided to the UE may be independently configured from the value configured for the gNB initiated COT, and may take any value from the set of values whether the same as or different from the value configured for the gNB initiated COT. In another embodiment, for the period, the value provided to the UE may be dependent on the value configured for the gNB initiated COT, where only a subset of values may be provided to the UE, such as values that are multiples of each other. As an example of this embodiment, if the gNB configured COT has a period of ems, then the UE may be provided with a period of 1, 2, 4, or 10 but not 2.5 or 5. The capability information may indicate the capability of the UE to initiate COTs, including the capability of the period of the UE initiated COT to take any value from the set of values in ms: {1, 2, 2.5, 4, 5, 10}, independent from the value configured for the period of the gNB initiated COT.

A UE may be provided with one or more such configurations. When the UE receives a switch command for switching from an ongoing COT to a new COT, it may stop using the configuration of the ongoing COT and starting using the configuration of the new COT. For example, it stops sharing the ongoing COT and moves to share a new COT. The dynamic indication of the new COT may require a gNB to provide the UE with the remaining duration of the new COT. Based on an indication of new COT parameters of the new COT from the gNB, the UE may be configured to respect the quiet (idle) periods associated with new COT parameters. The remaining COT duration of the new COT may be provided for instance in DCI Format 2_0, which is specified in TS 38.212.

In some embodiments, the DCI format 2_0 may be extended to signal a FFP configuration (or COT configuration) parameter switch or FFP configuration parameter indication by indicating the SemiStaticAccessConfig-ID. The DCI format 2_0 may be extended to indicate a target FFP (e.g., by indicating a FFP configuration or FFP configuration parameters of the target FFP or target COT (UE initiated COT or gNB initiated COT)) to a UE for the UE to switch to the target FFP configuration or use the target COT (UE initiated COT or gNB initiated FFP). The UE may use or switch to the indicated target COT, and start sharing after N_COT_switch time slots (transition time). Until then transmissions from the UE are considered in the ongoing UE COT. Before the transition time ends, the UE performs the transmissions in its ongoing COT. After the transition time ends, the UE start using the target COT. If the target COT expires before the N_COT_switch, the UE may not switch to the target COT, and it may finish the ongoing COT for the FFP. If the target FFP configuration for the FFP corresponds to one of the UE possible configurations (e.g., based on the SemiStaticChannelAccessConfig_UE_List), the UE may initiate a new COT with new COT parameters. The new COT parameters are of the target COT. If the COT parameters of the target COT belongs to SemiStaticChannelAccessConfig_gNB_List, the UE may monitor the gNB for a gNB initiated COT and may share the COT.

Figure 17:
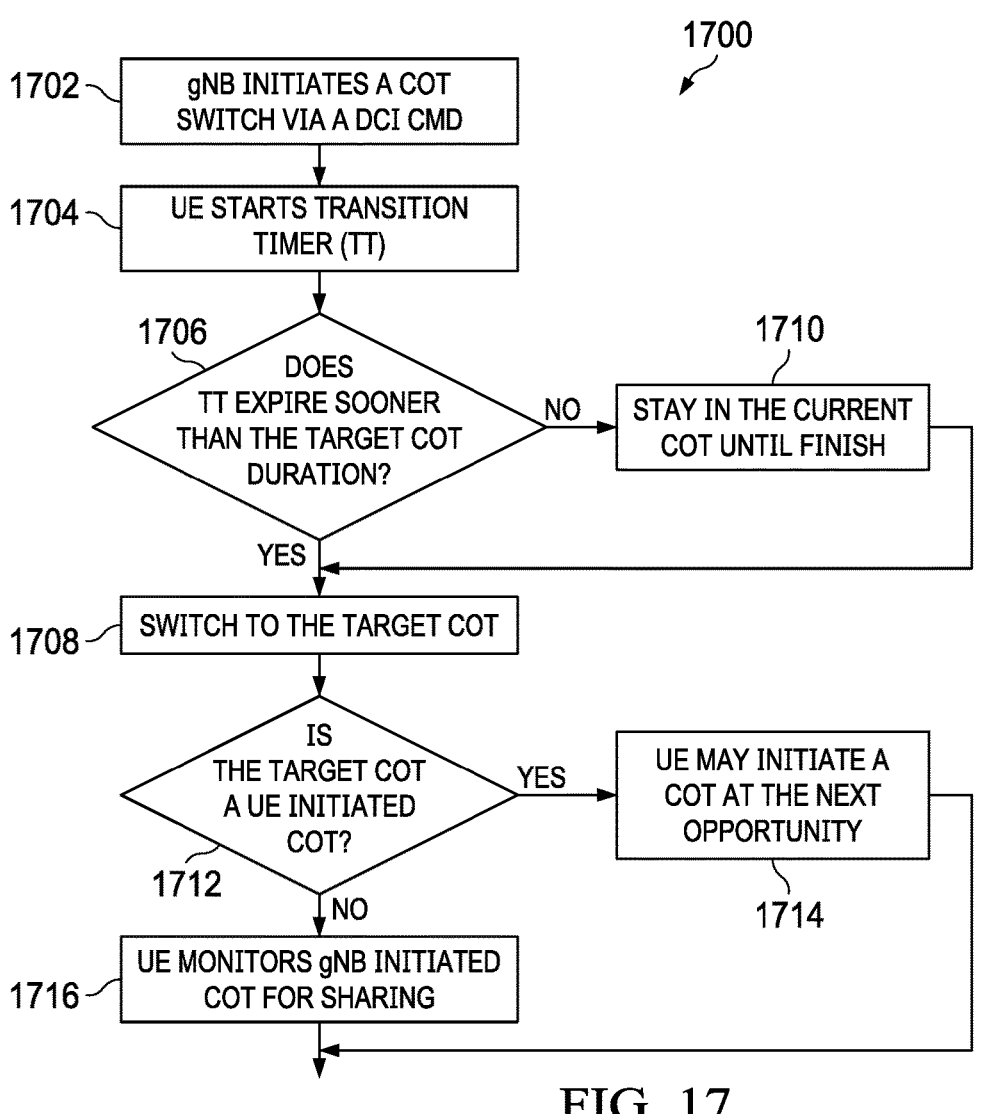
FIG. 17 is a flowchart of embodiment UE and gNB operations for COT switch.

FIG. 17 is a flowchart of embodiment UE and gNB operations 1700 for switching a COT of a UE. In this example, a gNB may instruct the UE to switch transmission from using a current COT to using a target COT. The gNB may initiate a COT switch via DCI command (step 1702). Upon receiving the command, the UE may start a transition timer (TT) for transit from the current COT to the target COT (step 1704). The UE may determine whether the TT will expire sooner than the target COT duration (step 1706). For example, the UE may determine whether the TT ends before the target COT ends. If the UE determines that the TT will expire before the target COT ends, the UE switches to the target COT after the TT expires (step 1708). The UE may switch to using COT parameters corresponding to the target COT. If the UE determines that the TT will expire after the target COT ends, the UE may continue to use the current COT for transmission until the current COT ends (step 1710), and the UE then switches to the target COT (step 1708). The UE may determine whether the target COT is a UE initiated COT (step 1712). If the target COT is a UE initiated COT, the UE may initiate a COT in the next opportunity (step 1714). The initiate COT has COT parameters of the target COT. If the target COT is not a UE initiated COT, the UE may monitor a gNB initiated COT for share (step 1716).

The gNB may provide, to the UE, configurations of a gNB initiated COT for FFP and/or a UE initiated COT for FFP. The configurations may be different.

As required by the spectrum regulations according to ETSI EN 301 893 V2.1.1 (2017-05), the UE initiated COT for FFP is triggered by an UL burst from the UE at the beginning of the UE FFP. The transmission follows the sensing of a channel for at least a sensing duration of 9 us during which the channel must be found idle.

Figure 18:
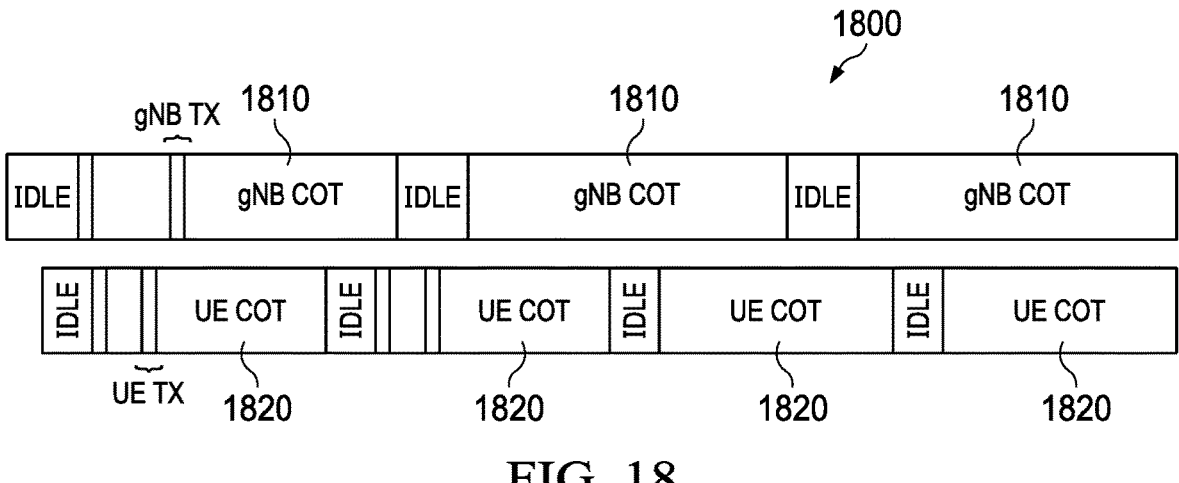
FIG. 18 is a diagram of embodiment gNB initiated COTs and UE initiated COTs, highlighting COT overlapping.

When a gNB initiated COT for FFP and a UE initiated COT for FFP overlap in time, their FFP periods and idle periods may not be aligned as shown in FIG. 18. FIG. 18 is a diagram 1800 showing gNB initiated COTs 1810 and UE initiated COTs 1820, which are not aligned with each another. The devices, the UE and the gNB, need to respect the transmission periods and idle periods associated with their own COTs. In other words, the gNB and the UE each use a specific set of parameters (e.g., FFP periodicity, an idle duration period, an offset of the FFP) associated with their own COTs. At the same time, the gNB and the UE may share the same COT (as specified in TS 37.213). The concept of sharing a COT needs to be revised and clearly defined. If the UE transmits during the UE initiated COT and the gNB transmits during the gNB initiated COT, and these two COTs overlap in time, as shown in the FIG. 18, questions may arise, such as whether the two COTs are able to be shared between the gNB and UE. In some embodiments, to clarify these situations, two devices may share a COT for FFP when they use the same set of COT for FFP parameters for their transmissions. That is, two devices share a COT for FFP if they use the same set of COT for FFP parameters for their transmissions.

In some embodiments, when a UE transmits during a COT for FFP that overlap another COT, the gNB should unequivocally identify to which COT a UE transmission belongs. The gNB needs to determine whether the COT that is used by the UE for the UE transmission belongs to a UE initiated COT or to a gNB initiated COT. In one embodiment, for the gNB may decodes a UE transmission burst that starts at the beginning of a UE FFP opportunity and interprets it as a UE COT initialization. That is, when the gNB receives the UE transmission burst that starts at the beginning of the UE FFP opportunity, the gNB may determine that the UE initiates a COT. However, whether the UE initiated its own COT or the UE is just sharing a gNB's COT cannot be unequivocally determined based on a simple UE transmission. To solve this dilemma, the UE may explicitly signal to the gNB that it initiated its own COT. For instance, a UL transmission of the UE may have an additional field that identifies or indicates a UE initiated COT or a gNB initiated COT. Such signaling may help the gNB to determine that a UE transmission belongs to the UE initiated COT for FFP, but does not clearly indicate the COT for further UE transmissions during the overlapping COTs.

To address these issues, a proposed solution, in an embodiment, requires that the transmissions from a UE shall belong to the same (a single) COT until that COT ends unless otherwise instructed by a gNB. This requires that once the UE initiates a COT for FFP, the UE keeps transmitting in the same COT, that is, the UE cannot switch back and forth between its own initiated COT and a gNB initiated COT. However, a gNB may instruct the UE to change to a different COT if necessary. For instance, the UE may decide to initiate its own COT, during which the gNB instructs the UE to switch to the gNB initiated COT and share that COT. Thus, the gNB can dynamically instruct the UE which set of COT parameters to use. The COT configuration change may be done via dynamic control information, e.g., DCI, or via a RRC configuration. A set of UE initiated COT for FFP parameters may be dynamically configured by the gNB. UL scheduling grants may specify the resources and the opportunities for the UE to initiate a COT for FFP. For Internet of Things (IoT) applications, an UL transmission may be triggered by an outside event forcing the UE to initiate COT at the closest opportunity time.

FIG. 19 is a flowchart of embodiment operations 1900 of a UE and a gNB for channel access, highlighting dynamic COT change. The gNB may configure parameters for a UE initiated COT and a gNB initiated COT (step 1902). The gNB may also allocate UL grants, e.g., resources, for a specific type of traffic and a specific COT (step 1904). The UE may initiate a COT for FFP via a UL burst (step 1906). The UL burst may start at the beginning of a FFP associated with the COT, which indicates that the UE initiates the COT. The gNB determines that the UE has initiated the COT (step 1908), e.g., based on the UL burst received by the gNB. The UE may determine whether the gNB dynamically instructs the UE to change to a new COT (step 1910). If the gNB does not instruct the UE to change to the new COT, the UE may continue using its initiated COT (step 1912). If the gNB instructs the UE to change to the new COT, the gNB may provide a remaining duration of the new COT and trigger the COT switch (step 1914). The gNB may instruct and trigger the COT switch by sending DCI to the UE. The DCI may include information about the remaining COT duration of the new COT. The UE may start using the new COT (step 1916).

In some embodiments, after a UE initiates its own COT, the UE may start a timer, and wait for validation of the UE initiated COT from a gNB. The validation may be any DL transmission that does not require the UE to switch to a different set of COT parameters (i.e., a different COT). If such a switch command is received by the UE before the expiration of the timer, the UE may switch to the different COT, using the different set of COT parameters. If such a switch command is not received by the UE before the timer expires, and no other DL transmission is received by the UE before the timer expires, the UE may automatically fall back to sharing gNB initiated COTs.

For UEs that indicates supporting for UE initiated COT in the FBE mode of operation, for instance in a capability indication, a gNB, when schedules an UL grant, may indicate whether an UL transmission from the UE should be performed using a gNB FFP configuration in a gNB initiated COT or using a UE FFP configuration in a UE initiated COT. The indication may be made using a DCI field, for example, and the presence of the DCI field indicates the type of FFP for UL transmission scheduling. The field may be always present during the FBE operation when gNB schedules a UE UL transmission. Such indication would avoid the necessity of additional rules to handle situations when the field is missing. An example of such situation is when there are a gNB initiated COT and a UE initiated COT which overlap each other. The presence of a DCI field indicating the type of COT UL transmission would allow the gNB to respond with low latency to some IIoT/URLLC operation events. In one embodiment, it may be specified, e.g., in standard, that the field in DCI that determines whether a scheduled UL transmission is based on UE-initiated COT or shared gNB initiated COT cannot be absent in the FBE mode of operation.

The UE initiated COT starts with an UL transmission as per ETSI requirement. An example of such UL transmission that may initiate a COT can be a configured grant periodic/semi-persistent transmission. There are, however, situations when a non-periodic/persistent transmission may be necessary. As an example, a gNB may need to schedule a UE to send an aperiodic SRS or an aperiodic CSI-RS report. If this happens at the end of a COT, the gNB may need to wait until the next COT and then send a DCI with a scheduling grant. Thus, additional delay will be added. However, if the gNB can schedule, at the end of COT, the UL grant after the beginning of next COT, the response time can be substantially improved.

In another example, a UE may send a request, e.g., a scheduling request (SR), close to the end of a COT. If a gNB can send a DCI with an allocation across COTs, the latency of UL transmission can be reduced.

In another example, a DCI scheduling an aperiodic transmission, with an indication indicating that the aperiodic transmission is to be executed in a UE initiated COT (FFP) for the next UE FFP period, can be used for one time UE initiated COT, for low latency non-periodic applications.

There may be various ways to indicate the scheduled time of a UL transmission, for example:

Have a DCI scheduling a transmission time larger than the current COT

Have a DCI indication of an FFP index (o means current) and the time of the UL transmission in that FFP (less than a COT duration)

Figure 26:
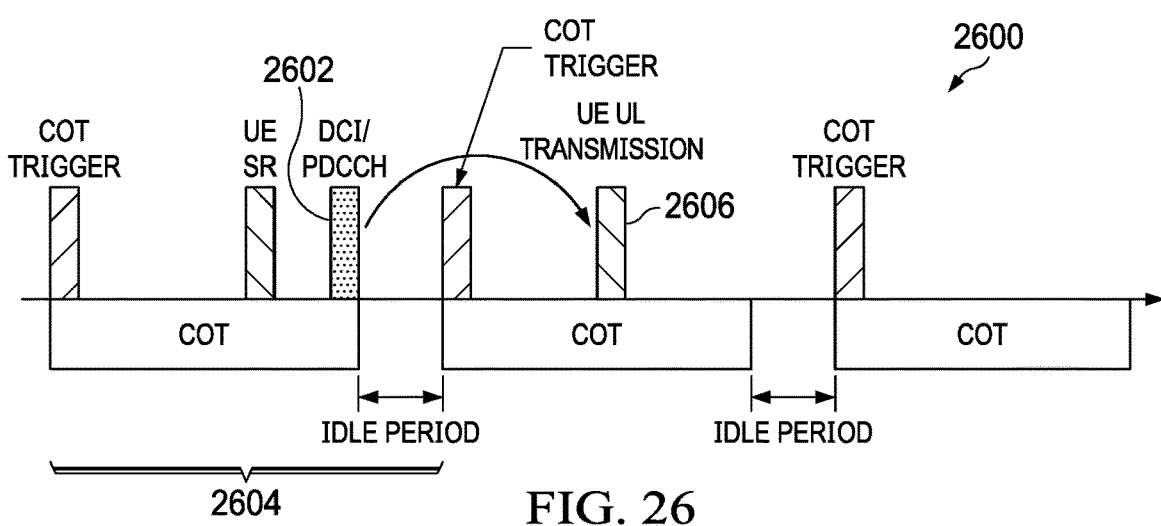
FIG. 26 is a diagram of embodiment gNB and UE operations.

When the scheduled time of the UL transmission is later than the end of the COT of the current FFP, as shown in FIG. 26, a UE may determine the FFP (where the UL transmission is to be performed) by calculating the difference between scheduled time and end of the COT of the current FFP and dividing the difference by the FFP duration. FIG. 26 is a diagram of embodiment operations 2600 between a gNB and a UE. The gNB sends a DCI 2602 at end of COT of a current FFP 2604, to schedule a UL transmission 2606.

It could happen that the gNB or the UE cannot initiate the next FFP due to LBT failure. In this case the device (gNB or UE) needs to wait for another FFP period before trying to initiate a new COT. If a UL transmission is scheduled in the failed FFP, the UE needs to postpone the schedule transmission to the next FFP. Therefore, when a UL transmission is scheduled for a future FFP (either in a gNB-FFP or UE-FFP) and that the FFP (COT of the FFP) cannot be initiated, the UL transmission is postponed to the next FFP that can be initiated (e.g., by the gNB or UE). Examples of such transmissions may include CSI-RS report, SRS, data, etc.

One additional issue to be solved is the type of FFP configuration to be used for a postponed transmission.

If the scheduling DCI indicates that the UL transmission scheduled after the end of current COT should be done in a gNB initiated COT or UE initiated COT, the UE may wait for a respective gNB initiated COT or UE initiated COT to transmit. That is, if the COT initiation fails, the UE will wait until the corresponding (necessary) COT is initiated. To calculate the time or slot index for the UL transmission, the UE may stop the slot counter when the COT (where the scheduling DCI is located) ends and continue incrementing the slot counter when the corresponding initiated COT starts.

In an embodiment, a default timer may be considered that starts when the cross-COT scheduling DCI is received. If the timer expires before the COT (indicated in the scheduling DCI) can be initiated, the UE may cancel its transmission and request for new resources.

Scheduling in a next FFP may be dependent on the type of UL transmission, such as data, SRS, or CSI. In addition, the postponement of the data may also be dependent on the type of transmission and/or its priority. For example, any transmission may be allowed in a next FFP, but further postponement may only be allowed for A-SRS or A-CSI reports.

In industrial Internet of things (IIoT) and URLLC applications, there are transmissions triggered by periodic events such as measurements and reports, and transmissions triggered by unplanned events such as alarms. To deal with unexpected/unplanned situations and schedule some higher priority transmissions over already scheduled periodic/semi-persistent transmissions, a gNB should be able to cancel pending transmissions including those UL transmissions that can initiate a COT. A possible solution is using the activation/deactivation of CG Type 2 PUSCH. Additional modes of cancellations can be also considered.

A gNB may cancel UL transmissions pending in a future FFP, including canceling future UE initiated COTs in future FFPs for instance, by canceling a UL transmission that initiates a COT.

Examples of cancellations signaling may include transmission of a DCI (e.g., in DCI 2_0), RRC, MAC CE, or the cancellations may be implemented via a timer expiration. Another way to cancel a future UE initiated COT may be that a gNB changes the symbol configuration from UL symbols to DL symbols.

To accommodate multiple UEs that independently initiate overlapping COTs, a gNB may request the UEs to switch to a different FFP configuration. For instance, the gNB may signal the UEs to switch to a gNB FFP configuration and a gNB initiated COT, which may bring the UEs in sync. The gNB may indicate UEs to switch between FFP configurations, for instance, from UE FFP to gNB FFP during a current UE initiated FFP or at future FFP boundaries. Examples of signaling for such switch could be performed via DCI, RRC, MAC CE associated with some timer expiration for the switch deadline.

In an embodiment, in case of link failure, a UE may switch to a gNB FFP configuration, i.e., waiting for a gNB initiated COT. In another embodiment, in case of link failure, a UE may be configured to initiate a COT in a UE FFP and transmit an UL broadcast (e.g., a distress signal or beacon). In this solution, the UE that lost the connectivity can be discovered much faster if it is surrounded by multiple receivers (such as gNBs).

In another embodiment, a default FFP may be configured by a gNB. If there is a link failure, the UE switches to the default FFP configuration. In another embodiment, the UE FFP configuration may fallback to a default configuration after a number of FFP failures due to LBT failures, i.e., consistent LBT failures, which may be different from the link failure.

In addition, UL scheduling grants for various types of traffic may specify respective sets of COT for FFP parameters to use. In this way, different types of UL traffic may be configured to be transmitted in different COTs. For instance, transmissions of some emergency or low latency indications may be allowed in a UE initiated COT, while other UL traffic may be allowed in a gNB initiated COT only. Thus different types of traffic may be allowed only in specific types of COT initialization.

In some embodiments, if a UE determines that a link between the UE and a gNB is lost, it may revert or fall back to a gNB initiated COT for FFP, and perform transmissions using a set of parameters of the gNB initiated COT.

FIG. 20 is a flowchart of embodiment operations 2000 of a UE and a gNB for channel access, highlighting validation of COT initiation of the UE. The gNB may configure parameters for a UE initiated COT and a gNB initiated COT (step 2002). The gNB may also allocate UL grants, e.g., resources, for a specific type of traffic and a specific COT (step 2004). The UE may initiate a COT for FFP via a UL burst, and start a timer for gNB validation (step 2006). The UE may wait for validation of the UE initiated COT from gNB before the timer expires. The UL burst may start at the beginning of a FFP associated with the COT, which indicates that the UE initiates the COT. The UE may determine whether the gNB validates the UE initiated COT (step 2008). If the UE determines that the gNB validates the UE initiated COT, the UE may continue to use its initiated COT (step 2010). If the UE determines that the gNB does not validate the UE initiated COT, the UE determine whether it receives an instruction to switch to and share a new COT (step 2012). If the UE receives the instruction, i.e., the gNB sends the instruction to the UE, this means that the gNB invalidates the UE initiated COT, the gNB may provide information of a remaining duration of the new COT to the UE, and trigger the switch (step 2014). The UE may start using (sharing) the new COT (step 2016). If the UE does not receives the instruction, and the timer for gNB validation expires, the UE may start using a gNB initiated COT (step 2018).

The corresponding resources for UE COT initiation for FFP may be configured, for instance, by CG Type 2 that is configured by RRC and activated by a PDCCH scrambled with a configured scheduling (CS)-RNTI before the UE COT utilization. In this way, the gNB may control directly whether the UE can or cannot initiate a COT in the next FFP. The UE may be configured with the necessary resources for UE COT initialization for FFP via CG Type 2.

A challenging scenario may rise when a gNB serves many UEs that can initiate COTs independently. Such situations are quite likely for IoT applications. In this case, control of the UE initiated COTs may become quite complex, as the gNB cannot predict which and when the UEs (e.g., IoT devices) may initiate a COT, and multiple UE initiated COTs may overlap in time. A possible solution to handle a large number of UE devices is that the UE devices may be divided in groups and the (re)configuration (e.g., COT configuration) may be group based via group common controls. In one embodiment, UE group based dynamic (re)configuration of a UE initiated COT for FFP may be supported, such as group based dynamic (re)configuration of COT parameters.

Figures 21, 22, 23:
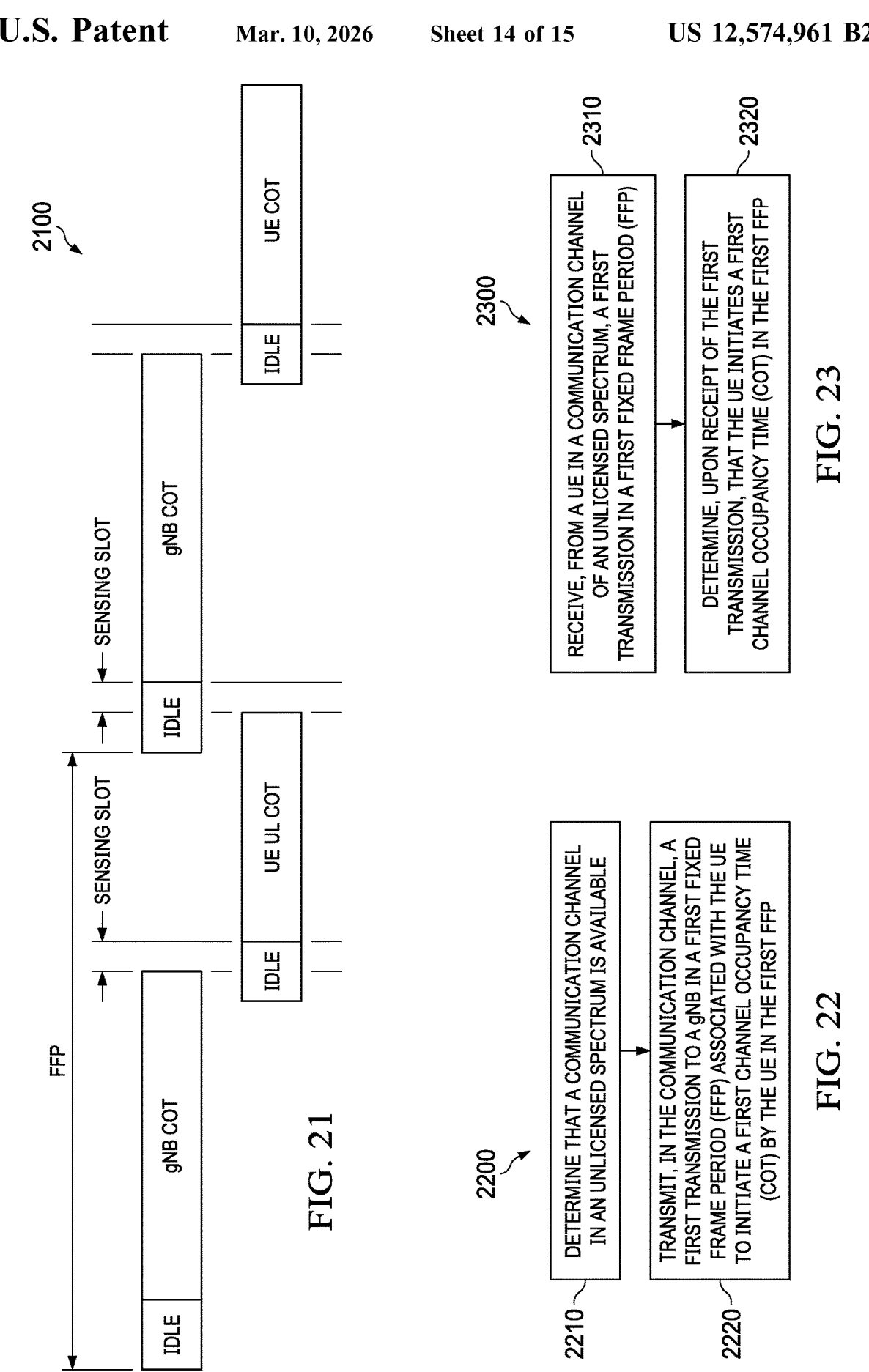
FIG. 21 is a diagram of embodiment gNB initiated COTs and UE initiated COTs, highlighting non-overlapping COTs occupying a channel.
FIG. 22 is a flowchart of an embodiment method for UE COT initiation.
FIG. 23 is a flowchart of another embodiment method for UE COT initiation.

There is a possibility that a gNB and a UE may alternate their COTs as shown in FIG. 21, where the gNB and the UE may occupy the entire channel for a larger duty cycle than allowed by the regulators (>95%). In other words, while gNB and UE respect their own idle periods, overall they occupy the channel for more than 95%. FIG. 21 is a diagram 2100 illustrating embodiment COTs of the gNB and the UE, highlighting non-overlapping COTs of the gNB and the UE occupying the channel. In one embodiment, the situation may be avoided when the UE and the gNB share the same COT for FFP. Therefore, the gNB and UE will respect the idle time for the corresponding FFP and avoid capturing the channel.

Some type of UEs may be able to or be allowed to initiate COTs, and some type of UEs may not be able to or not be allowed to initiate COTs. For example, legacy UEs may not be able to initiate a COT for FFP, while new URLLC UEs may be able to. In the case, if a UE can initiate a COT with a RACH transmission, the UE may inform a gNB that it has the capability to initiate a COT. As an example, the UE may indicate its capability using specific PRACH sequences, or via a message 3 (MSG3) if the UE receives a message 2 (MSG2) that allows the UE to initiate a COT for FFP. The UE should support capabilities signaling to inform a gNB that it can initiate COTs for FFP. The signaling can be provided during a random access, or via a PUCCH or a PUSCH.

Embodiments of the present disclosure provide the following:

A method for a UE to initiate a periodic COT, which may or not be confirmed by a gNB. A method for a group of UEs to contend to initiate aperiodic COT, which may be confirmed by a gNB.

A method for a UE and a gNB to compete to initiate a periodic COT. This provides opportunities for flexible UL and DL transmissions when the gNB has priority for initiating the periodic COT. The UE may wait for a random time period.

A method for a gNB to communicate with a UE that wins contention of a periodic COT, and the UE is the owner of the periodic COT for a number of periods. The owner means that the UE is the only device that can trigger a COT for a number of periods.

A method to specify different traffic types allowed in specific COT initializations, for example, emergency traffic is allowed in a UE initiated COT and gNB initiated COTs, and some traffic with low priority may only be allowed in a gNB initiated COT, etc.

Group (re-)configuration of COT for FFP parameters. Dynamic change of the UE COT for FFP parameters which validates or invalidates the ongoing COT.

Capability signaling for supporting UE initiated COTs.

A UE falls back to share a gNB initiated COT after link failure, or invalidation from a gNB.

FIG. 22 is a flowchart of an embodiment method 2200 for UE COT initiation. The method 2200 may be indicative of operations by a UE operating in a FBE mode. As shown, the UE may determine that a communication channel in an unlicensed spectrum is available (step 2210). The UE may transmit, in the communication channel, a first transmission to a gNB in a fixed frame period (FFP) associated with the UE to initiate a channel occupancy time (COT) by the UE in the FFP. The first transmission starts at the beginning of the FFP and ends before an idle period within the FFP (step 2220).

FIG. 23 is a flowchart of another embodiment method 2300 for UE COT initiation. The method 2300 may be indicative of operations by a gNB communicating with a UE operating in a FBE mode. The gNB may receive, from the UE in a communication channel of an unlicensed spectrum, a first transmission in a fixed frame period (FFP) (step 2310). The first transmission may start at the beginning of the FFP and end before an idle period of the FFP. The gNB may determine, upon receipt of the first transmission, that the UE initiates a channel occupancy time (COT) in the FFP (step 2320).

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, a detecting unit/module, a COT switching unit/module, an instructing unit/module, a timer starting unit/module, an allocating unit/module, a configuring unit/module, a signaling unit/module, an indicating unit/module, a validating unit/module, a COT acknowledging/unacknowledging/rejecting unit/module, a COT initiating unit/module, a COT monitoring unit/module, a COT sharing unit/module, and/or a requesting unit/module. The respective units/modules may be hardware, software, or a combination thereof. For instance, one or more of the units/modules may be an integrated circuit, such as field programmable gate arrays (FPGAs) or application-specific integrated circuits (ASICs).

Figure 24:
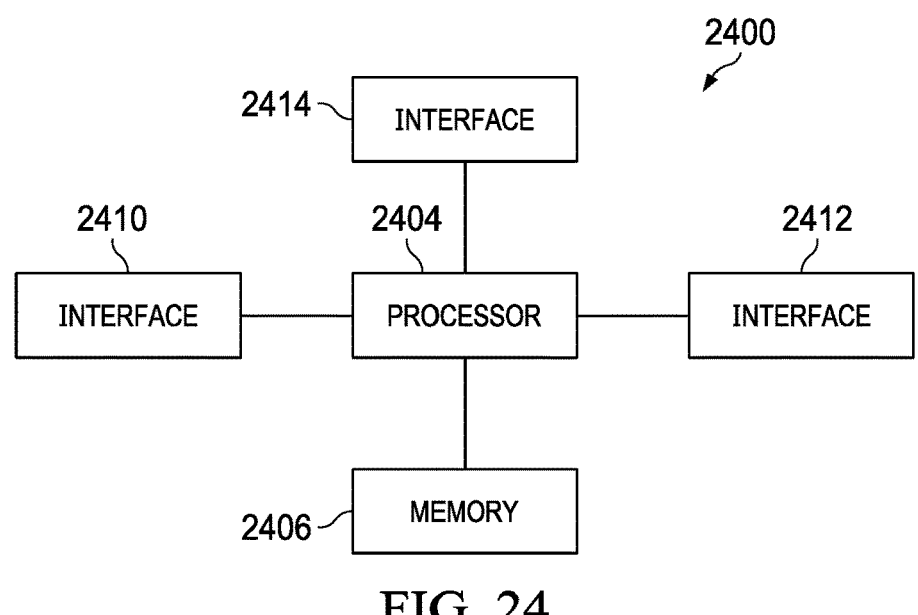
FIG. 24 is a diagram of an embodiment processing system.

Embodiments of the present disclosure may be implemented as computer-implemented methods. The embodiments may be performed by a processing system. FIG. 24 illustrates a block diagram of an embodiment processing system 2400 for performing methods described herein, which may be installed in a host device. As shown, the processing system 2400 includes a processor 2404, a memory 2406, and interfaces 2410-2414, which may (or may not) be arranged as shown in FIG. 24. The processor 2404 may be any component or collection of components adapted to perform computations and/or other processing related tasks, and the memory 2406 may be any component or collection of components adapted to store programming and/or instructions for execution by the processor 2404. In an embodiment, the memory 2406 includes a non-transitory computer readable medium. The interfaces 2410, 2412, 2414 may be any component or collection of components that allow the processing system 2400 to communicate with other devices/components and/or a user. For example, one or more of the interfaces 2410, 2412, 2414 may be adapted to communicate data, control, or management messages from the processor 2404 to applications installed on the host device and/or a remote device. As another example, one or more of the interfaces 2410, 2412, 2414 may be adapted to allow a user or user device (e.g., personal computer (PC), etc.) to interact/communicate with the processing system 2400. The processing system 2400 may include additional components not depicted in FIG. 24, such as long term storage (e.g., non-volatile memory, etc.).

In some embodiments, the processing system 2400 is included in a network device that is accessing, or part otherwise of, a telecommunications network. In one example, the processing system 2400 is in a network-side device in a wireless or wireline telecommunications network, such as a base station, a relay station, a scheduler, a controller, a gateway, a router, an applications server, or any other device in the telecommunications network. In other embodiments, the processing system 2400 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 25:
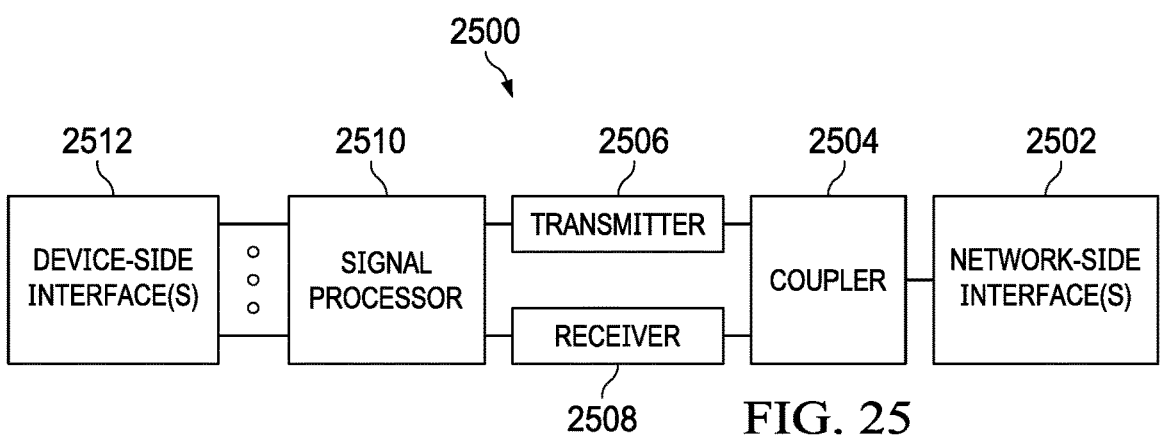
FIG. 25 is a diagram of an embodiment transceiver.

In some embodiments, one or more of the interfaces 2410, 2412, 2414 connects the processing system 2400 to a transceiver adapted to transmit and receive signaling over the telecommunications network. FIG. 25 illustrates a block diagram of a transceiver 2500 adapted to transmit and receive signaling over a telecommunications network. The transceiver 2500 may be installed in a host device. As shown, the transceiver 2500 comprises a network-side interface 2502, a coupler 2504, a transmitter 2506, a receiver 2508, a signal processor 2510, and a device-side interface 2512. The network-side interface 2502 may include any component or collection of components adapted to transmit or receive signaling over a wireless or wireline telecommunications network. The coupler 2504 may include any component or collection of components adapted to facilitate bi-directional communication over the network-side interface 2502. The transmitter 2506 may include any component or collection of components (e.g., up-converter, power amplifier, etc.) adapted to convert a baseband signal into a modulated carrier signal suitable for transmission over the network-side interface 2502. The receiver 2508 may include any component or collection of components (e.g., down-converter, low noise amplifier, etc.) adapted to convert a carrier signal received over the network-side interface 2502 into a baseband signal. The signal processor 2510 may include any component or collection of components adapted to convert a baseband signal into a data signal suitable for communication over the device-side interface(s) 2512, or vice-versa. The device-side interface(s) 2512 may include any component or collection of components adapted to communicate data-signals between the signal processor 2510 and components within the host device (e.g., the processing system 2400, local area network (LAN) ports, etc.).

The transceiver 2500 may transmit and receive signaling over any type of communications medium. In some embodiments, the transceiver 2500 transmits and receives signaling over a wireless medium. For example, the transceiver 2500 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2502 comprises one or more antenna/radiating elements. For example, the network-side interface 2502 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2500 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The following references are related to subject matter of the present application. Each of these references is incorporated herein by reference in its entirety:

3GPP TS 38.213, V16.5.0 (2021-03), "3rd Generation Partnership Project; Technical Specification Group Radio Access Network; NR; Physical layer procedures for control (Release 16)";

3GPP TS 37.213, V16.3.0 (2020-09), "3rd Generation Partnership Project; Technical Specification Group Radio Access Network; Physical layer procedures for shared spectrum channel access (Release 16)"; and ETSI EN 301 893 V2.1.1 (2017-05), "5 GHz RLAN; Harmonised Standard covering the essential requirements of article 3.2 of Directive 2014/53/EU".

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
   receiving, by a user equipment (UE), a configuration of a first channel occupancy time (COT), the configuration indicating a periodicity of a fixed frame period (FFP), a maximum allowed COT duration in the FFP (MCOT), and idle duration information;

determining, by the UE in a frame based equipment (FBE) mode, that a communication channel in an unlicensed spectrum is available for use, wherein the communication channel includes the first COT; and
   transmitting, by the UE in the communication channel, a first transmission to a gNB in the FFP associated with the UE to initiate the first COT in the FFP by the UE, the first transmission starting at beginning of the FFP and ending before an idle period within the FFP.

2. The method of claim 1, wherein the determining that the communication channel is available comprises:
   performing, by the UE, a clear channel assessment (CCA).

3. The method of claim 2, wherein the determining that the communication channel is available comprises:
   starting, by the UE, a backoff counter after the CCA succeeds; and
   determining, by the UE, that the communication channel is available when the backoff counter is decremented to zero (o).

4. The method of claim 1, wherein the first transmission includes a physical uplink control channel (PUCCH), a physical uplink shared channel (PUSCH), channel state information (CSI), a scheduling request (SR), a random access preamble, or a sounding reference signal (SRS).

5. The method of claim 1, wherein the first transmission occupies an entire or a part of a frequency bandwidth of the communication channel.

6. The method of claim 1, further comprising:
   receiving, by the UE, information of a time interval (T_UE_COT) during which the UE is allowed to initiate periodic COTs, the time interval comprising the FFP.

7. The method of claim 1, wherein the first COT is a periodic COT initiated by the UE.

8. The method of claim 1,
   the configuration configuring the UE to initiate a semi-static COT in the communication channel.

9. The method of claim 1,
   wherein the idle duration information indicates at least one of a minimum idle duration in the FFP or a maximum idle duration in the FFP, and
   wherein the configuration further indicates at least one of:
   a COT index of the first COT;
   a time offset of the FFP;
   an offset of the FFP; or
   frequency resources for uplink transmissions during the first COT.

10. The method of claim 9, wherein the offset of the FFP or a starting position of the FFP is relative to a boundary of a radio frame of an even index number.

11. The method of claim 9, wherein the periodicity of the FFP comprises a value in millisecond (ms) of {1, 2, 2.5, 4, 5, 10}.

12. The method of claim 9, wherein the periodicity of the FFP comprises any one value in millisecond (ms) of {1, 2, 2.5, 4, 5, 10}, or a subset of values of {1, 2, 2.5, 4, 5, 10} according to capability of the UE to initiate COTs.

13. The method of claim 9, wherein the periodicity is in a range of 1 ms to 10 ms.

14. The method of claim 9, wherein the configuration is received through dedicated RRC signaling.

15. The method of claim 1, further comprising:
   receiving, by the UE, information of a listen before talk (LBT) type for sensing the communication channel.

16. The method of claim 1, further comprising:

transmitting, by the UE, capability information indicating capability of the UE to initiate COTs.

17. A method comprising:

transmitting, by a base station to a user equipment (UE), a configuration of a first channel occupancy time (COT), the configuration indicating a periodicity of a fixed frame period (FFP), a maximum allowed COT duration in the FFP (MCOT), and idle duration information;

receiving, by the base station from the UE in a communication channel of an unlicensed spectrum, a first transmission in the FFP, the UE in a frame based equipment (FBE) mode, wherein the communication channel includes the first COT; and determining, by the base station based on the first transmission, that the UE initiates the first COT in the FFP in response to the first transmission starting at beginning of the FFP and ending before an idle period of the FFP.

18. An apparatus comprising:

a non-transitory memory storage storing instructions; and one or more processors in communication with the non-transitory memory storage, wherein the instructions, when executed by the one or more processors, cause the apparatus to perform operations including:

receiving a configuration of a first channel occupancy time (COT), the configuration indicating a periodicity of a fixed frame period (FFP), a maximum allowed COT duration in the FFP (MCOT), and idle duration information;

determining that a communication channel in an unlicensed spectrum is available for use, the apparatus in a frame based equipment (FBE) mode, wherein the communication channel includes the first COT; and transmitting, in the communication channel, a first transmission to a gNB in the FFP associated with the apparatus to initiate the first COT by the apparatus in the FFP, the first transmission starting at beginning of the FFP and ending before an idle period within the FFP.

19. The apparatus of claim 18, wherein the determining that the communication channel is available comprises:

performing a clear channel assessment (CCA).

20. The apparatus of claim 19, wherein the determining that the communication channel is available comprises:

starting a backoff counter after the CCA succeeds; and determining that the communication channel is available when the backoff counter is decremented to zero (0).

21. The apparatus of claim 18, wherein the first transmission includes a physical uplink control channel (PUCCH), a physical uplink shared channel (PUSCH), channel state information (CSI), a scheduling request (SR), a random access preamble, or a sounding reference signal (SRS).

22. The apparatus of claim 18, wherein the first transmission occupies an entire or a part of a frequency bandwidth of the communication channel.

23. A base station comprising:

a non-transitory memory storage storing instructions; and one or more processors in communication with the non-transitory memory storage, wherein the instructions, when executed by the one or more processors, cause the base station to perform operations including:

transmitting, to a user equipment (UE), a configuration of a first channel occupancy time (COT), the configuration indicating a periodicity of a fixed frame period (FFP), a maximum allowed COT duration in the FFP (MCOT), and idle duration information;

receiving, from the UE in a communication channel of an unlicensed spectrum, a first transmission in the FFP, the UE in a frame based equipment (FBE) mode, wherein the communication channel includes the first COT; and determining, based on the first transmission, that the UE initiates the first COT in the FFP in response to the first transmission starting at beginning of the FFP and ending before an idle period of the FFP.

24. The base station of claim 23, wherein the first transmission occupies an entire or a part of a frequency bandwidth of the communication channel.

25. The base station of claim 23, the operations further comprising:

transmitting, to the UE, information of a time interval (T_UE_COT) during which the UE is allowed to initiate periodic COTs, the time interval comprising the FFP.

26. The base station of claim 23, wherein the first COT is a periodic COT initiated by the UE.

27. The base station of claim 23, the configuration configuring the UE to initiate a semi-static COT in the communication channel.

* * * * *